(12) United States Patent
Giles

(10) Patent No.: US 11,905,707 B2
(45) Date of Patent: Feb. 20, 2024

(54) FOAM WALL STRUCTURES AND METHODS FOR THEIR MANUFACTURE

(71) Applicant: Covestro LLC, Pittsburgh, PA (US)

(72) Inventor: Eric C. Giles, Pittsburgh, PA (US)

(73) Assignee: Covestro LLC, Pittsburgh, PA (US)

( * ) Notice: Subject to any disclaimer, the term of this patent is extended or adjusted under 35 U.S.C. 154(b) by 378 days.

(21) Appl. No.: 17/361,957

(22) Filed: Jun. 29, 2021

(65) Prior Publication Data

US 2022/0412081 A1  Dec. 29, 2022

(51) Int. Cl.
*E04B 2/84* (2006.01)
*C08G 18/18* (2006.01)
(Continued)

(52) U.S. Cl.
CPC .......... *E04B 2/847* (2013.01); *C08G 18/1808* (2013.01); *C08G 18/1825* (2013.01);
(Continued)

(58) Field of Classification Search
CPC . E04B 2/847; C08G 18/1808; C08G 18/1825; C08G 18/2027; C08G 18/242; C08G 18/4219; C08G 18/72; C08G 2110/0058; C08J 9/148; C08J 2203/164; C08J 2375/04
See application file for complete search history.

(56) References Cited

U.S. PATENT DOCUMENTS 2,009,619 A  7/1935  Huffine
2,030,157 A  2/1936  Cumpston
(Continued)

FOREIGN PATENT DOCUMENTS

CN  103709727 A  4/2014
CN  104497251 A  4/2015
(Continued)

OTHER PUBLICATIONS

Oertel, Guenther, Polyurethane Handbook (2nd Edition), 1994, p. 276.
(Continued)

*Primary Examiner* — Rodney Mintz
(74) *Attorney, Agent, or Firm* — Donald R. Palladino

(57) ABSTRACT

Foam wall structures and methods for making them are described. The wall structures include a frame, a foam panel overlying a front surface of the frame, and a polyurethane foam layer disposed in a cavity of the wall structure. The polyurethane foam layer has a density, as determined by ASTM D1622-14, of at least 44 kg/m$^3$(2.75 lb/ft$^3$) and exhibits ASTM E84-16 Class A flame spread and smoke development characteristics. The polyurethane foam layer is the cured reaction product of a polyurethane foam-forming composition that includes a polyisocyanate, an aromatic polyester polyol having a functionality of greater than 2.5 and an OH number of at least 300 mg KOH/g, which is present in an amount of at least 50% by weight, based on the total weight of the polyurethane foam-forming composition less the weight of the polyisocyanate, a catalyst, and a blowing agent composition. The blowing agent composition includes water and a hydrofluoroolefin.

20 Claims, 6 Drawing Sheets

(51) Int. Cl.
*C08G 18/20* (2006.01)
*C08G 18/24* (2006.01)
*C08G 18/42* (2006.01)
*C08G 18/72* (2006.01)
*C08J 9/14* (2006.01)

(52) U.S. Cl.
CPC ....... *C08G 18/2027* (2013.01); *C08G 18/242* (2013.01); *C08G 18/4219* (2013.01); *C08G 18/72* (2013.01); *C08J 9/148* (2013.01); *C08G 2110/0058* (2021.01); *C08J 2203/10* (2013.01); *C08J 2203/164* (2013.01); *C08J 2375/04* (2013.01)

(56) References Cited

U.S. PATENT DOCUMENTS

| | | | |
|---|---|---|---|
| 2,055,032 | A | 9/1936 | Johnson |
| 2,271,929 | A | 2/1942 | Venzie |
| 2,745,779 | A | 5/1956 | Ritter |
| 2,780,090 | A | 2/1957 | Rasmussen |
| 3,619,437 | A | 11/1971 | McDonald, Jr. |
| 4,236,361 | A | 12/1980 | Boden |
| 4,292,775 | A | 10/1981 | Howard |
| 4,443,988 | A | 4/1984 | Coutu, Sr. |
| 4,471,591 | A | 9/1984 | Jamison |
| 4,671,038 | A | 6/1987 | Porter |
| 4,765,105 | A | 8/1988 | Tissington et al. |
| 4,786,547 | A | 11/1988 | St-Michel |
| 4,856,244 | A | 8/1989 | Clapp |
| 4,885,886 | A | 12/1989 | Rosso |
| 5,353,560 | A | 10/1994 | Heydon |
| 5,389,167 | A | 2/1995 | Sperber |
| 5,417,023 | A | 5/1995 | Mandish |
| 5,950,386 | A | 9/1999 | Shipman et al. |
| 5,950,389 | A | 9/1999 | Porter |
| 5,953,883 | A | 9/1999 | Ojala |
| 5,979,131 | A | 11/1999 | Remmele et al. |
| 6,085,479 | A | 7/2000 | Carver |
| 6,205,729 | B1 | 3/2001 | Porter |
| 6,308,491 | B1 | 10/2001 | Porter |
| 6,314,695 | B1 | 11/2001 | Belleau |
| 6,332,304 | B1 | 12/2001 | Fuhrman |
| 6,408,594 | B1 | 6/2002 | Porter |
| 6,438,915 | B1 | 8/2002 | Beauboeuf |
| 6,481,172 | B1 | 11/2002 | Porter |
| 6,715,249 | B2 | 4/2004 | Rusek |
| 7,036,284 | B1 | 5/2006 | Larson |
| 8,299,137 | B2 | 10/2012 | Loh et al. |
| 8,635,778 | B1 | 1/2014 | Hagaman |
| 8,959,862 | B1 | 2/2015 | Kreizinger |
| 9,145,688 | B2 | 9/2015 | Hunt-Hansen |
| 9,556,335 | B2 | 1/2017 | Chen et al. |
| 9,562,359 | B1 | 2/2017 | Grisolia et al. |
| 9,809,674 | B2 | 11/2017 | Shieh |
| 9,938,711 | B2 | 4/2018 | Grisolia et al. |
| 9,988,483 | B2 | 6/2018 | Forkner et al. |
| 10,006,198 | B2 | 6/2018 | Parsons et al. |
| 10,059,824 | B2 | 8/2018 | Taylor et al. |
| 10,131,758 | B2 | 11/2018 | Younes et al. |
| 10,280,275 | B2 | 5/2019 | Okada et al. |
| 10,294,668 | B2 | 5/2019 | Kreizinger |
| 10,301,823 | B2 | 5/2019 | Kreizinger |
| 10,370,849 | B2 | 8/2019 | Lambach et al. |
| 10,392,487 | B2 | 8/2019 | Taylor et al. |
| 10,415,244 | B2 | 9/2019 | Giles et al. |
| 10,479,859 | B2* | 11/2019 | Queen ................ C08G 63/66 |
| 11,225,790 | B1* | 1/2022 | Lambach ............ B32B 15/046 |
| 11,566,425 | B2* | 1/2023 | Espada ................ E04C 2/246 |
| 11,732,081 | B2* | 8/2023 | Bell ............................ C08J 9/08 521/67 |
| 11,745,465 | B2* | 9/2023 | Vairo ................... B29C 44/321 52/309.6 |
| 2002/0012785 | A1 | 1/2002 | Leduc |
| 2002/0108320 | A1 | 8/2002 | Weiss |
| 2002/0129577 | A1 | 9/2002 | Weiss |
| 2003/0041544 | A1 | 3/2003 | Devalapura et al. |
| 2004/0016194 | A1 | 1/2004 | Stefanutti et al. |
| 2004/0200171 | A1 | 10/2004 | Schilger |
| 2005/0055973 | A1 | 3/2005 | Hagen, III et al. |
| 2005/0106360 | A1 | 5/2005 | Castiglione |
| 2005/0188649 | A1 | 9/2005 | Hagen, III |
| 2005/0247021 | A1 | 11/2005 | Schauffele |
| 2006/0026925 | A1 | 2/2006 | Layfield |
| 2007/0094963 | A1 | 5/2007 | McDonald et al. |
| 2007/0100009 | A1 | 5/2007 | Creazzo et al. |
| 2009/0098357 | A1 | 4/2009 | Bergtold |
| 2009/0320397 | A1 | 12/2009 | Hansbro et al. |
| 2010/0011701 | A1 | 1/2010 | Cole et al. |
| 2010/0043327 | A1 | 2/2010 | Rothwell |
| 2010/0095613 | A1 | 4/2010 | Paetkau |
| 2010/0210747 | A1 | 8/2010 | Loh et al. |
| 2010/0216904 | A1 | 8/2010 | Loh et al. |
| 2011/0124756 | A1 | 5/2011 | Singh et al. |
| 2011/0138724 | A1 | 6/2011 | Olang |
| 2011/0173911 | A1 | 7/2011 | Propst |
| 2011/0214374 | A1 | 9/2011 | Propst |
| 2012/0011792 | A1 | 1/2012 | Dewildt et al. |
| 2012/0028563 | A1 | 2/2012 | Sacks |
| 2012/0096785 | A1 | 4/2012 | Weeks |
| 2012/0159765 | A1 | 6/2012 | Propst |
| 2012/0240501 | A1 | 9/2012 | Spiegel |
| 2012/0247040 | A1 | 10/2012 | Buoni et al. |
| 2012/0313035 | A1 | 12/2012 | Williams et al. |
| 2013/0104469 | A1 | 5/2013 | Fay |
| 2013/0104480 | A1 | 5/2013 | Smith |
| 2013/0305643 | A1 | 11/2013 | Singleton et al. |
| 2013/0312350 | A1 | 11/2013 | Kreizinger |
| 2014/0053486 | A1 | 2/2014 | Grisolia et al. |
| 2014/0115991 | A1 | 5/2014 | Davenport et al. |
| 2014/0220333 | A1 | 8/2014 | Bogdan |
| 2014/0250827 | A1 | 9/2014 | Gillman |
| 2014/0265027 | A1 | 9/2014 | Kreizinger |
| 2015/0051304 | A1* | 2/2015 | Shieh ................... C08G 63/916 525/437 |
| 2015/0111001 | A1 | 4/2015 | Sagnard et al. |
| 2015/0140243 | A1 | 5/2015 | Sagnard et al. |
| 2015/0210818 | A1 | 7/2015 | Loh |
| 2015/0232631 | A1 | 8/2015 | Balbo Block et al. |
| 2016/0145374 | A1 | 5/2016 | Ishikawa |
| 2016/0152739 | A1 | 6/2016 | Eilbracht et al. |
| 2017/0030074 | A1 | 2/2017 | Ndobo-Epoy et al. |
| 2018/0030232 | A1 | 2/2018 | Kurita et al. |
| 2019/0119439 | A1* | 4/2019 | Queen ................ C08G 18/7671 |
| 2019/0136005 | A1 | 5/2019 | Williams et al. |
| 2019/0322790 | A1 | 10/2019 | Rider et al. |
| 2019/0322791 | A1 | 10/2019 | Rider et al. |
| 2020/0247938 | A1 | 8/2020 | Li et al. |
| 2020/0247941 | A1 | 8/2020 | Yu et al. |
| 2020/0283561 | A1 | 9/2020 | Parks |
| 2020/0283563 | A1 | 9/2020 | Parks et al. |
| 2020/0339733 | A1 | 10/2020 | Rider et al. |
| 2020/0353716 | A1* | 11/2020 | Vairo ......................... E04B 1/80 |
| 2021/0301526 | A1* | 9/2021 | Leahy .................. B32B 13/045 |
| 2022/0034090 | A1 | 2/2022 | Espada et al. |
| 2022/0064358 | A1 | 3/2022 | Sendijarevic |
| 2022/0169816 | A1 | 6/2022 | Yu et al. |
| 2022/0389148 | A1* | 12/2022 | Bell ..................... C08G 18/5024 |
| 2022/0412080 | A1* | 12/2022 | Giles ................... C08G 18/242 |

FOREIGN PATENT DOCUMENTS

| | | |
|---|---|---|
| CN | 108164737 A | 6/2018 |
| CN | 109485903 A | 3/2019 |
| DE | 202014004695 U1 | 7/2014 |
| IE | 20050080 A1 | 8/2006 |
| JP | 5546961 A | 4/1980 |
| JP | 56000437 A | 1/1981 |
| JP | 60108609 U | 7/1985 |
| JP | 3115643 A | 5/1991 |
| JP | 11200521 A | 7/1999 |
| JP | 2008132676 A | 6/2008 |
| JP | 3159655 U | 5/2010 |
| JP | 2013091246 A | 5/2013 |

(56) References Cited

FOREIGN PATENT DOCUMENTS

| WO | 9914442 A1 | 3/1999 | | |
|---|---|---|---|---|
| WO | 9929978 A1 | 6/1999 | | |
| WO | 2007053670 A2 | 5/2007 | | |
| WO | 2009014965 A1 | 1/2009 | | |
| WO | 2012105657 A1 | 8/2012 | | |
| WO | 2012115936 A2 | 8/2012 | | |
| WO | 2014133986 A1 | 9/2014 | | |
| WO | 2014134087 A1 | 9/2014 | | |
| WO | 2015050139 A1 | 4/2015 | | |
| WO | 2017050887 A1 | 3/2017 | | |
| WO | 2018167220 A1 | 9/2018 | | |
| WO | WO-2020120384 A1 | * | 6/2020 | ............... E04B 1/14 |
| WO | 2020223059 A1 | 11/2020 | | |
| WO | 2021011521 A1 | 1/2021 | | |

OTHER PUBLICATIONS

U.S. Appl. No. 17/036,323, filed Sep. 29, 2020, entitled Foam Wall Structures and Methods for Their Manufacture, James L. Lambach et al.

U.S. Appl. No. 17/361,872, filed Jun. 29, 2021, entitled HFO-Containing Isocyanate-Reactive Compositions, Related Polyurethane Foam-Forming Compositions, and Spray-Applied Polyurethane Foams, Eric C. Giles.

* cited by examiner

FOAM WALL STRUCTURES AND METHODS FOR THEIR MANUFACTURE

FIELD

The inventions described in this specification relate to foam wall structures, and methods for their manufacture, in which a structural, HFO-blown, foam layer exhibiting ASTM E84-16 Class A flame spread and smoke development characteristics is disposed between frame members of the wall structure.

BACKGROUND

Relatively recently, insulated wall structures satisfying strict industry insulation requirements have been developed that can be made without excessive material and labor costs. According to one proposal, a foam wall structure includes a foam panel, such as a faced polyisocyanurate panel, attached to at least a portion of a front frame surface, such that the faced polyisocyanurate panel and frame members define one or more voids within the frame; and a foam layer received within at least a portion of one of the voids within the frame, wherein the foam layer adheres to at least a portion of the faced polyisocyanurate panel.

Such foam wall structures can provide many benefits. They can exhibit high racking shear strength and excellent thermal resistance. Moreover, they can be fabricated in a controlled, possibly highly automated, manufacturing facility that is away from the construction site, thus increasing the likelihood of consistent results/performance, all while reducing labor and material costs.

The foam layer used in such wall structures can be a spray polyurethane foam (SPFs) formed by combining a polyol component and a polyisocyanate in the presence of water and a physical blowing agent. Aromatic polyester polyols and sucrose-based polyether polyols are often used in the polyol component. Such polyols are often selected for SPF applications because of fire resistance properties they tend to impart to the foam. An important factor in achieving high racking shear strength in such wall structures is the use of a relatively high density (at least 2.8 lb/ft$^3$) structural spray-applied foam layer deposited within the frame voids. A thicker "structural foam layer" can enhance the racking shear strength performance of the wall structure.

Historically, the physical blowing agents used in SPFs have been chlorofluorocarbons (CFCs) and hydrochlorofluorocarbons (HCFCs). CFCs and HCFCs are, however, now disfavored because of their ozone depletion potential and relatively high global warming potential. As a result, alternative physical blowing agents are under consideration.

One class of alternative physical blowing agents with low or no ozone depletion potential and low global warming potential are certain halogenated olefins, such as fluoroolefins, that include at least one halogen, such as fluorine, and at least one carbon-carbon double bond. Some of these fluoroolefins also include hydrogen and, as a result, are sometimes referred to as hydrofluoroolefins or HFOs.

An important factor for commercial acceptance of a foam for the construction industry is the ASTM E84 classification of the foam. In some applications, a NFPA 101 Life Cycle Safety Code Class A designation may be required. To achieve this, the foam must exhibit a flame spread index (FSI) of 25 or less and a smoke-developed index (SDI) of 450 or less according to ASTM E84-21 at the applied foam thickness.

As a result, it would be highly desirable to provide wall structures that include a relatively high density structural foam layer that exhibits an ASTM-E84 Class A rating at any foam thickness and that provides a wall structure exhibiting high racking shear strengths, even in the absence of OSB, plywood, or other structure sheathing materials.

SUMMARY

In certain respects, the specification relates to wall structures. These wall structures comprise: (a) a frame comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a foam panel overlying the front frame surface, wherein: (i) the foam panel abuts the front frame surface such that the first member, the second member, and the connecting members define a cavity, and/or (ii) a non-foam sheathing abuts the front frame surface between the front frame surface and the foam panel, such that the non-foam sheathing, the first member, the second member, and the connecting members define the cavity; and (c) a polyurethane foam layer disposed within the cavity. The polyurethane foam layer adheres to a rear surface of the foam panel and/or, if present, a rear surface of the non-foam sheathing. The polyurethane foam layer has a density, as determined by ASTM D1622-14, of at least 44 kg/m$^3$ (2.75 lb/ft$^3$), and exhibits ASTM E84-16 Class A flame spread and smoke development characteristics. The polyurethane foam layer is the cured reaction product of a polyurethane foam-forming composition comprising: a polyisocyanate, an aromatic polyester polyol having a functionality of greater than 2.5 and an OH number of at least 300 mg KOH/g, which is present in an amount of at least 50% by weight, based on the total weight of the polyurethane foam-forming composition less the weight of the polyisocyanate; a catalyst, and a blowing agent composition comprising water and a hydrofluoroolefin.

In still other respects, this specification is directed to methods for manufacturing a wall structure. These methods comprise depositing a polyurethane foam-forming composition into a cavity of the wall structure to form a polyurethane foam layer in the cavity that adheres to a rear surface of either (i) a foam panel that abuts a front frame surface, the front frame surface being formed by a front surface of a first member, a front surface of a second member that is spaced apart from the first member, and a front surface of connecting members extending between the first member and the second member, wherein the foam panel, the first member, the second member, and the connecting members define the cavity, and/or (ii) a non-foam sheathing that abuts the front frame surface and is between the front frame surface and the foam panel, wherein the non-foam sheathing, the first member, the second member, and the connecting members define the cavity. The polyurethane foam layer deposited in the cavity has a density, as determined by ASTM D1622-14, of at least 44 kg/m$^3$ (2.75 lb/ft$^3$) and exhibits ASTM E84-16 Class A flame spread and smoke development characteristics. The polyurethane foam-forming composition comprises: (a) a polyisocyanate, (b) an aromatic polyester polyol having a functionality of greater than 2.5 and an OH number of at least 300 mg KOH/g, which is present in an amount of at least 50% by weight, based on the total weight of the polyurethane foam-forming composition less the weight of the polyisocyanate; (c) a catalyst, and (d) a blowing agent composition comprising water; and a hydrofluoroolefin.

The present specification also relates, among other things, buildings comprising such wall structures.

BRIEF DESCRIPTION OF THE DRAWINGS

Various features and characteristics of the inventions described in this specification may be better understood by reference to the accompanying figures, in which.

Figure 1:
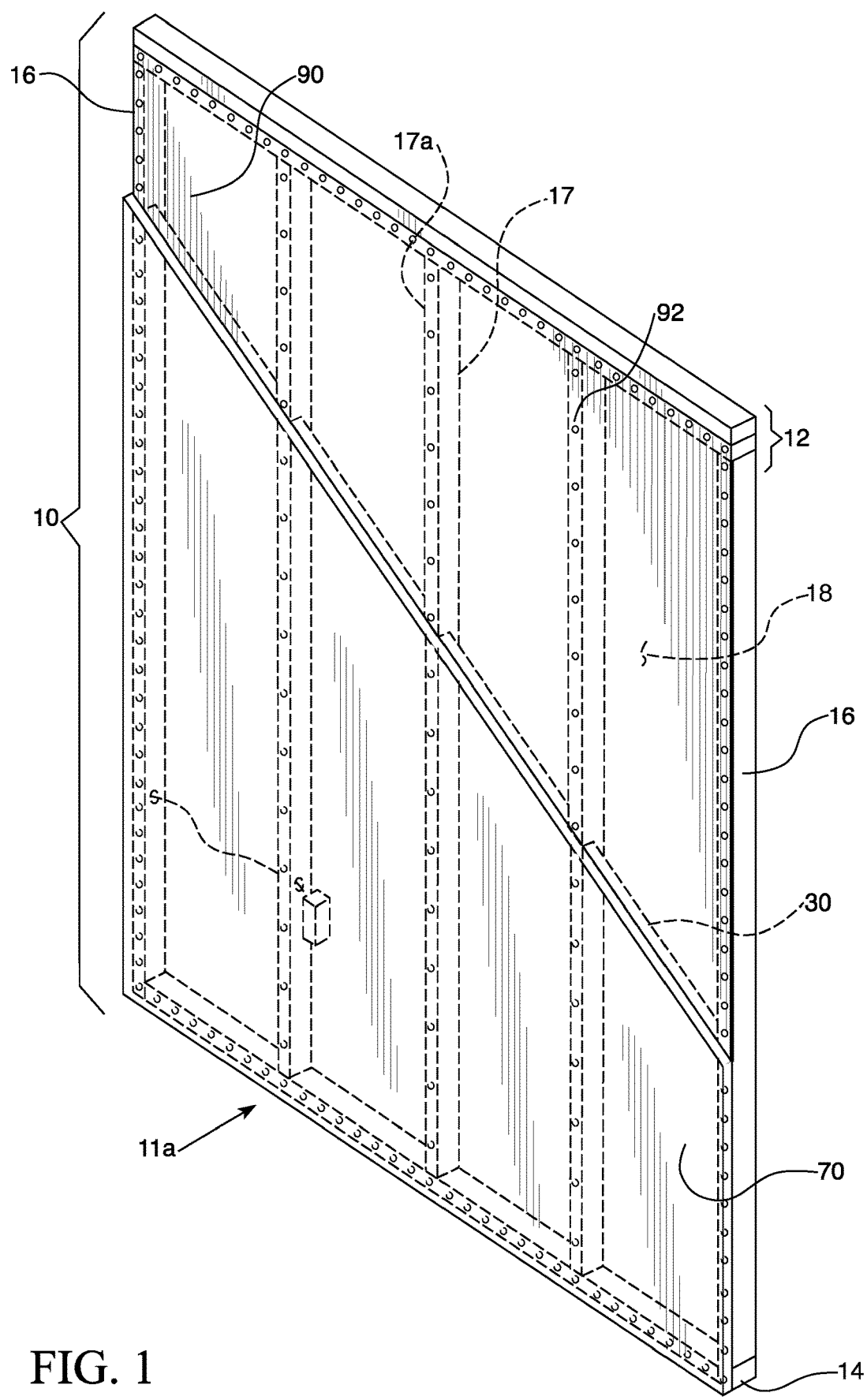
FIG. 1 is a front perspective view of an embodiment of a wall structure of this specification.

The reader will appreciate the foregoing features and characteristics, as well as others, upon considering the following detailed description of the inventions according to this specification.

DETAILED DESCRIPTION

As used in this specification, the term "front" refers to the side, face, or surface of a structure or component oriented towards the outside direction of an exterior wall of a building, and the term "rear" refers to the side, face, or surface of a structure or component oriented towards the inside direction of an exterior wall of a building.

The present specification is directed to wall structures, methods for their manufacture, and use of such structures as a wall in a building. Referring first to FIGS. 1-4, a wall structure 10 comprises frame 11. The frame 11 comprises a first member 12, a second member 14 spaced apart from the first member 12, and connecting members (such as the two side members and primary support member) 16, 17 extending between the first member 12 and the second member 14. As used herein, the term "connecting member" refers to a member that connects first member 12 with second member 14 and includes side members 16 and primary support members 17. The first member 12, the second member 14, and the connecting members 16, 17 each comprise a front surface and a rear surface that collectively form a front frame surface 11*a* and a rear frame surface 11*b*. The constituent members (12, 14, 16, and 17) of the frame 11 can be made out of a suitable material of construction such as wood. For example, the constituent members (12, 14, 16 and 17) of the frame 11 can comprise wooden 2×4 members (i.e., structural members made of wood having nominal thicknesses of about 2-inches, nominal widths of about 4-inches, and suitable lengths) secured together with fasteners such as nails, nail plates, screws, staples, bolts, or rivets, or a combination of any thereof.

In some implementations, a non-foam sheathing 90 may overlie the front frame surface 11*a*. As used in this specification, the term "overlie" means that the structure or component being discussed is oriented in front of the structure or component it is being compared to, i.e., the structure or component being discussed is oriented nearer to the outside direction of an exterior wall of a building than the structure or component it is being compared to.

In addition to overlying the front frame surface 11*a*, the non-foam sheathing 90, when present, may also abut the front frame surface 11*a*. As used herein, "abut" means that the structure or component being discussed means that the structure or component touches the structure or component it is being compared to so that the two structures or component are not spaced apart from each other.

In some implementations, the non-foam sheathing 90, when present, comprises a metallic sheathing, such as a sheet metal sheathing. As used in this specification, the term "sheet metal" refers to metal formed into flat, impermeable pieces having a thickness of 0.1 mm to 8 mm. In some implementations, the sheet metal sheathing 90 comprises a ferrous metal, such as carbon steel, galvanized steel, galvannealed steel, and stainless steel, though other metals, such as aluminum, brass, copper, tin, nickel, and titanium, can be readily envisaged. In some implementations, sheet metal sheathing 90 has a thickness ranging from 0.18 to 3.74 mm (0.007 to 0.147 inch), such as 0.18 to 1.11 mm (0.007 to 0.043 inch), 0.31 to 0.80 mm (0.012 to 0.031 inch), 0.31 to 0.63 mm (0.012 to 0.025 inch), in some cases, 0.31 to 0.55 mm (0.012 to 0.022 inch). As used in this specification, the term "sheathing" refers to a covering placed over a wall frame that forms a surface onto which other materials can be applied.

In some implementations, sheet metal sheathing 90 is fastened to the front frame surface 11*a*. The sheet metal sheathing 90, in some implementations, is mechanically fastened to any of the front faces (12*a*, 14*a*, 16*a* and/or 17*a*) of the constituent members (12, 14, 16 and 17) of the frame 11. For example, the sheet metal sheathing 90 can be mechanically fastened to the front faces 12*a* and 14*a* of the first and second members 12 and 14 and/or to the front faces 16*a*, 17*a* of the connecting members 16, 17 extending therebetween. The sheet metal sheathing 90 can be mechanically fastened to the front frame surface 11*a* with mechanical fasteners 92. "Mechanical fasteners", as will be appreciated, refers to fasteners that rely on some mechanical principle (i.e. not adhesives) and are semi-permanent (i.e. unlike clamps). Attachment mechanical fasteners can include, for example, nails, staples, screws, bolts, or rivets, or a combination of any thereof. Alternatively (or in addition) sheet metal sheathing 90 can be fastened to front frame surface 11*a* using an adhesive. Attachment adhesives can comprise a construction adhesive that is compatible with the adjoining materials. For example, an adhesive used to fasten sheet metal sheathing 90 to a frame 11 can comprise a foam material (which may be the same foam material or a different foam material as the foam material comprising the foam layer 30, described below). In other words, in such implementations, foam panel 70 at least partially directly overlies sheet metal sheathing 90 with no gap between them.

By abutting foam panel 70 against sheet metal sheathing 90 as described herein, the wall structures of this specification are easy to assemble. Moreover, and importantly, because sheet metal sheathing 90 is relatively thin, this enables the wall structures described herein to be of essentially the same thickness as other adjacent wall structures that may be employed in the building, such adjacent wall structures not employing the use of a sheet metal sheathing 90 because it may not be necessary. As a result, it is possible to maintain a constant wall thickness relative to other wall structures used in the building, which is typically highly desirable, and this can be done without reducing the amount of thermally insulating foam used.

In some implementations, in lieu of non-foam sheathing 90 being sheet metal sheathing, non-foam sheathing 90 may be a metal mesh sheathing. In such implementations, rather than being a sheet metal sheathing as depicted in FIGS. 1-4, non-foam sheathing 90 may be a mesh that overlies the front frame surface 11*a* and is mechanically fastened to the front frame surface 11*a*. In addition to overlying the front frame surface 11*a*, the mesh may also abut the front frame surface 11*a*.

As used in this specification, the term "mesh" refers to an element that has a network structure comprising a plurality interlacing solid parts with regularly spaced apertures. Meshes suitable for use herein include those made of a metal or alloy, nylon or another thermoset polymer, a thermoplastic polymer such as polyethylene, an organic or inorganic woven or non-woven material, or any material capable of operating as a screen, i.e., of sufficient porosity, whereby some of the foam layer (described below) penetrates through the apertures of the mesh.

In some implementations, the mesh comprises an expanded metal (such as carbon steel, galvanized steel, stainless steel, aluminum or another metal), metal wire cloth (either woven or welded wires made of carbon steel, galvanized steel, stainless steel, or another metal), glass fibers, or plastic, though other materials can be readily envisioned. The apertures may be, for example, of a square, diamond, rhombus, or hexagonal pattern. For example, in some implementations, the mesh has a thickness of 0.005 to 0.2 inch (0.127 to 5.08 millimeters), such as 0.01 to 0.1 inch (0.254 to 2.54 millimeters) or 0.02 to 0.05 inch (0.508 to 1.27 millimeters). The apertures of the mesh, in some implementations, have a size of 0.25 to 1 inch (6.35 to 25.4 millimeters), such as 0.25 to 0.75 inch (6.35 to 19.05 millimeters) in the longest-dimension thereof. Thus, as will be appreciated, in some implementations, the width and/or height of the apertures of the mesh are larger than the thickness of the mesh.

The mesh is typically mechanically fastened to the front frame surface 11*a*. The mesh can be mechanically fastened to any of the front faces (12*a*, 14*a*, 16*a* and/or 17*a*) of the constituent members (12, 14, 16 and 17) of the frame 11. For example, the mesh can be mechanically fastened to the front faces 12*a* and 14*a* of the first and second members 12 and 14 and/or to the front faces 16*a*, 17*a* of the connecting members 16, 17 extending therebetween. The mesh can be mechanically fastened to the front frame surface 11*a* with mechanical fasteners. Suitable mechanical fasteners can include, but are not limited to, nails, staples, screws, bolts, or rivets, or a combination of any thereof.

As indicated, an aspect of some embodiments of the wall structures of this specification is that mesh is mechanically fastened to the front frame surface 11*a*. Thus, in these implementations. mesh is not merely only placed between the front frame surface 11*a* and the foam panel 70, to be subsequently held in place by the penetrating foam layer 30. Rather, by mechanically fastening mesh flat against the front frame surface 11*a* it's easier to position the polyiso board flat against the front frame surface 11*a* and attach it to the front frame surface 11*a*. This can be particularly important because if the polyiso board is not in close contact to the framing, and not held close to the frame while the spray foam is being applied, it can expand and push the board out further, and then cure in that conformation. Much of the foam in the interfacial area can leak across the interface, either into another cavity, or if at a perimeter location, the foam extrudes and must be removed. This is time consuming and wasteful. In addition, the polyiso board side of the panel loses its flatness because the polyiso board has been pushed out, either by the mesh, or exacerbated by expanding foam in the interface. Now panels don't line up with one another, and the sight line along a series of panels can be wavy or offset, thereby impacting the ability to attach exterior cladding in the same plane along the sight line of a wall at the job site.

According some implementations of the wall structures of this specification, foam panel 70 abuts and overlies the mesh. As will be appreciated, therefore, it is not necessary and, in fact in many cases, the foam layer 30, while penetrating the mesh and adhering to foam panel 70, does not necessarily encapsulate all or any of mesh. For example, in some implementations, foam panel 70 abuts mesh at the portions of foam panel 70 that overlie frame members 12, 14, 16 and/or 17. Foam panel 70 may also abut the mesh at portions of foam panel 70 that overlie cavity 18 however, in some of these cases, at least some of foam panel 70 may not abut mesh at portions of foam panel 70 that overlie cavity 18, due to fact that mesh may, and often is, itself flexible and may not lie perfectly straight over cavity 18.

By abutting foam panel 70 against the mesh, the wall structures of this specification are easy to assemble. Moreover, and importantly, this enables the wall structures described herein to be of essentially the same thickness as other adjacent wall structures that may be employed in the building, such adjacent wall structures not employing the use of a mesh because it may not be necessary. As a result, it is possible to maintain a constant wall thickness relative to other wall structures used in the building, which is typically highly desirable.

In still other implementations of the wall structures of this specification, there is no non-foam sheathing 90 disposed between foam panel 70 and front frame surface 11*a*. Thus, in these implementations, foam panel 70 overlies front frame surface 11*a* such that foam panel 70 abuts front frame surface 11*a* to thereby, along with first member 12, the second member 16, and the connecting members 16, 17, define the cavity 18. Such an embodiment of the wall structure of this specification is illustrated by FIGS. 5-8.

As shown in FIGS. 5-8, the wall structure 10 includes a frame 11, a foam panel 70, and a foam layer 30. As shown in FIGS. 9 and 10, the frame 11 may be defined by a first member 12, a second member 14 spaced apart from the first member 12, and connecting members 16 extending between the first member 12 and the second member 14. The first member 12, the second member 14, and the connecting members 16 each have a front surface 12*a*, 14*a*, 16*a* and a rear surface 12*b*, 14*b*, 16*b* that define a front frame surface 11*a* and a rear frame surface 11*b*, respectively.

Figure 2:
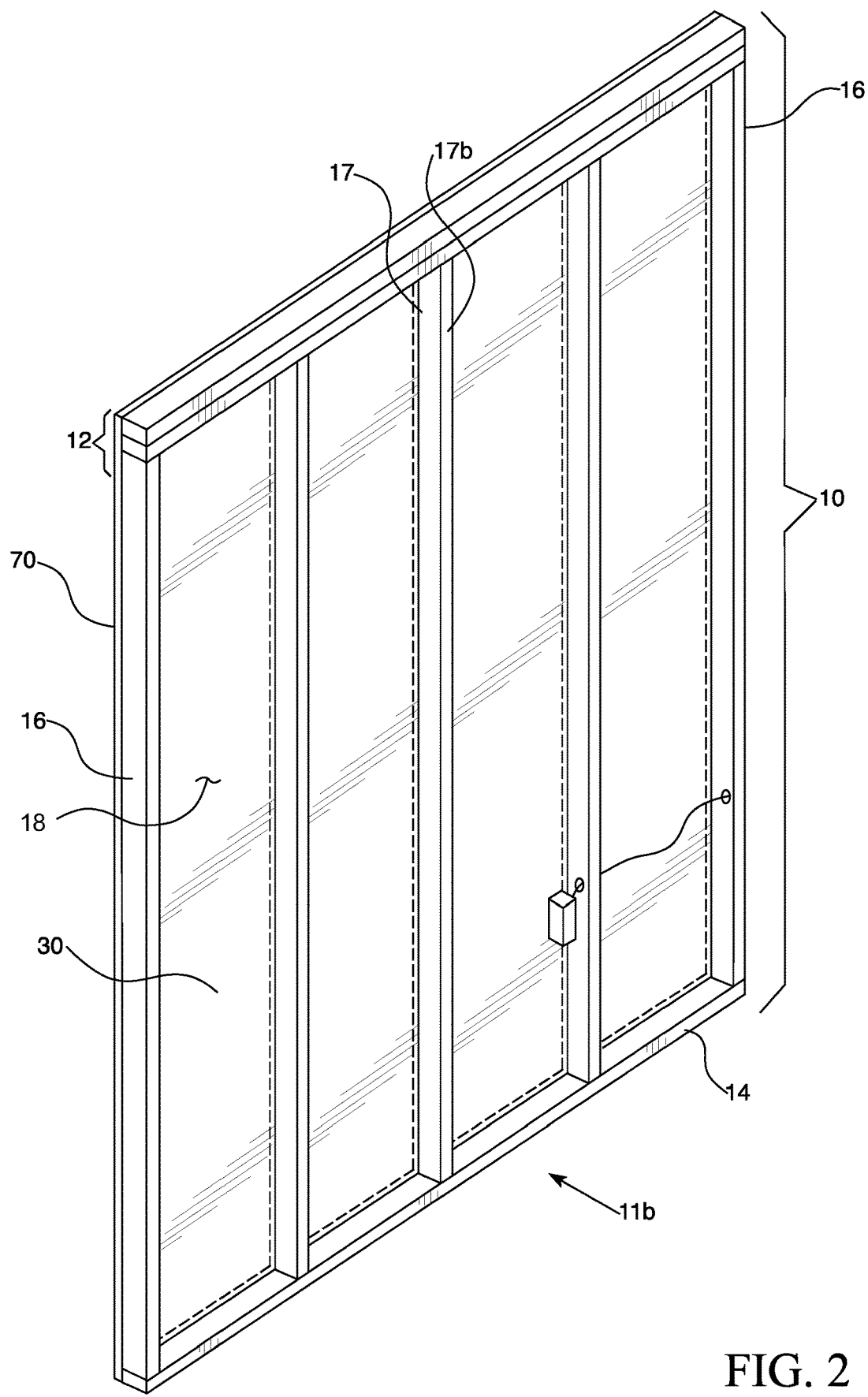
FIG. 2 is a rear perspective view of the foam wall structure of FIG. 1.
Figure 3:
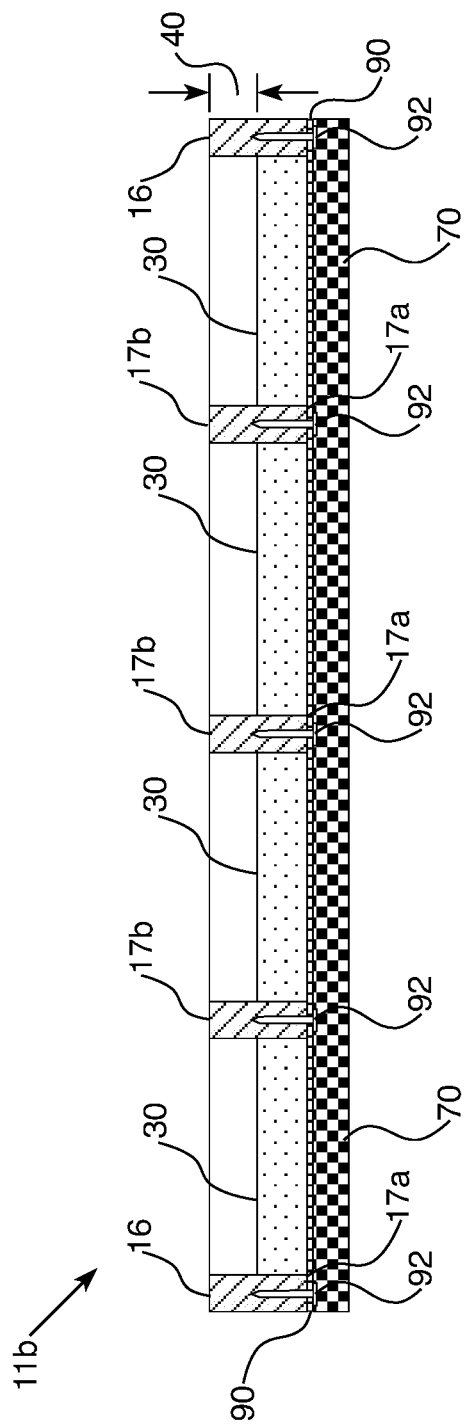
FIG. 3 is a horizontal cross-sectional view of the foam wall structure of FIG. 1
Figure 4:
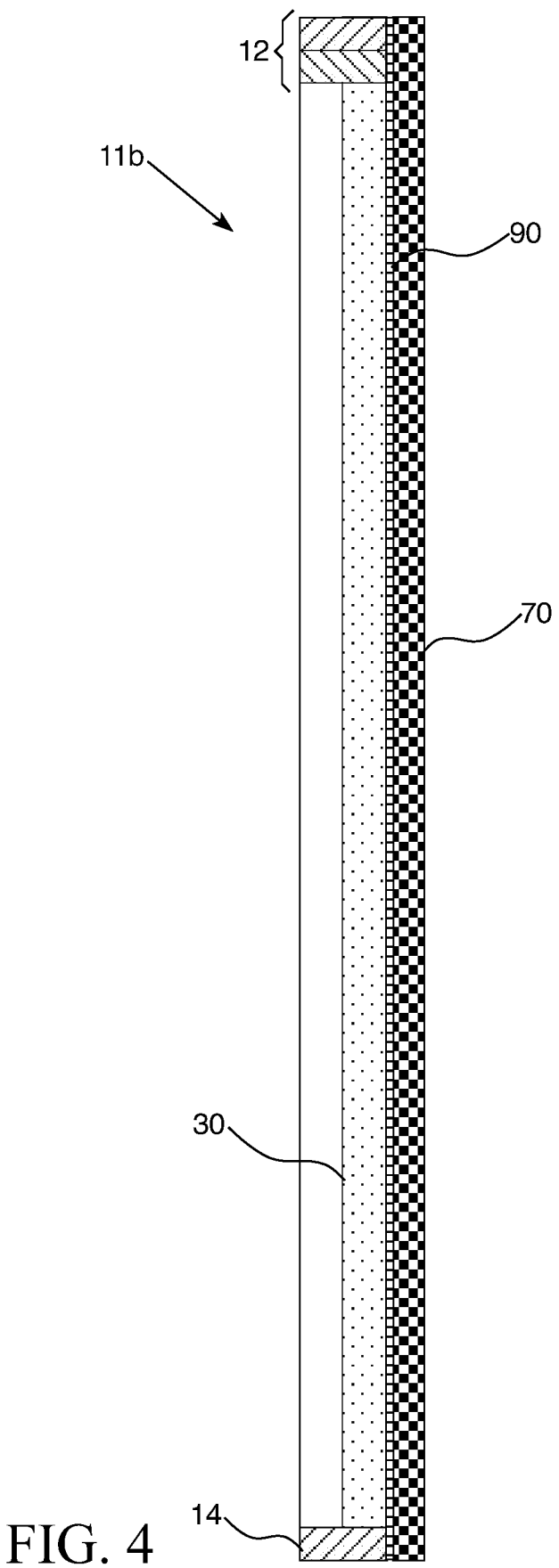
FIG. 4 is a vertical cross-sectional view of the foam wall structure of FIG. 1.
Figure 6:
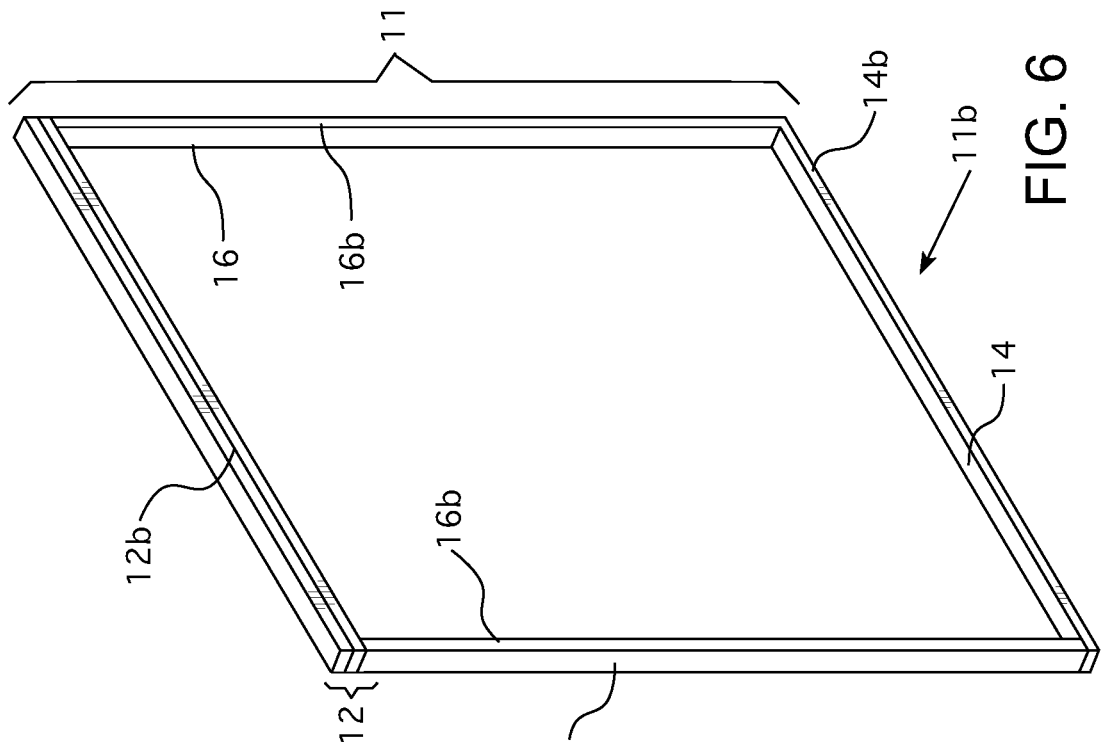
FIG. 6 is a rear perspective view of the foam wall structure of FIG. 5.
Figure 5:
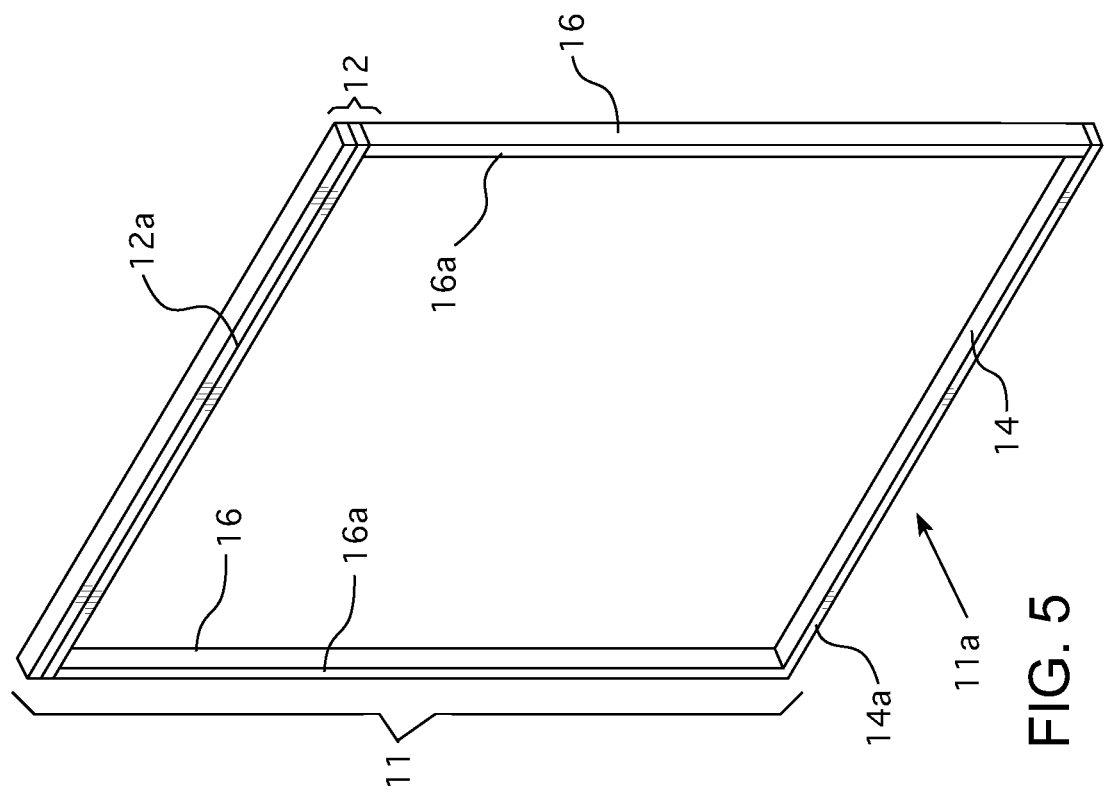
FIG. 5 is a front perspective view of an embodiment of a wall structure of this specification.
Figure 8:
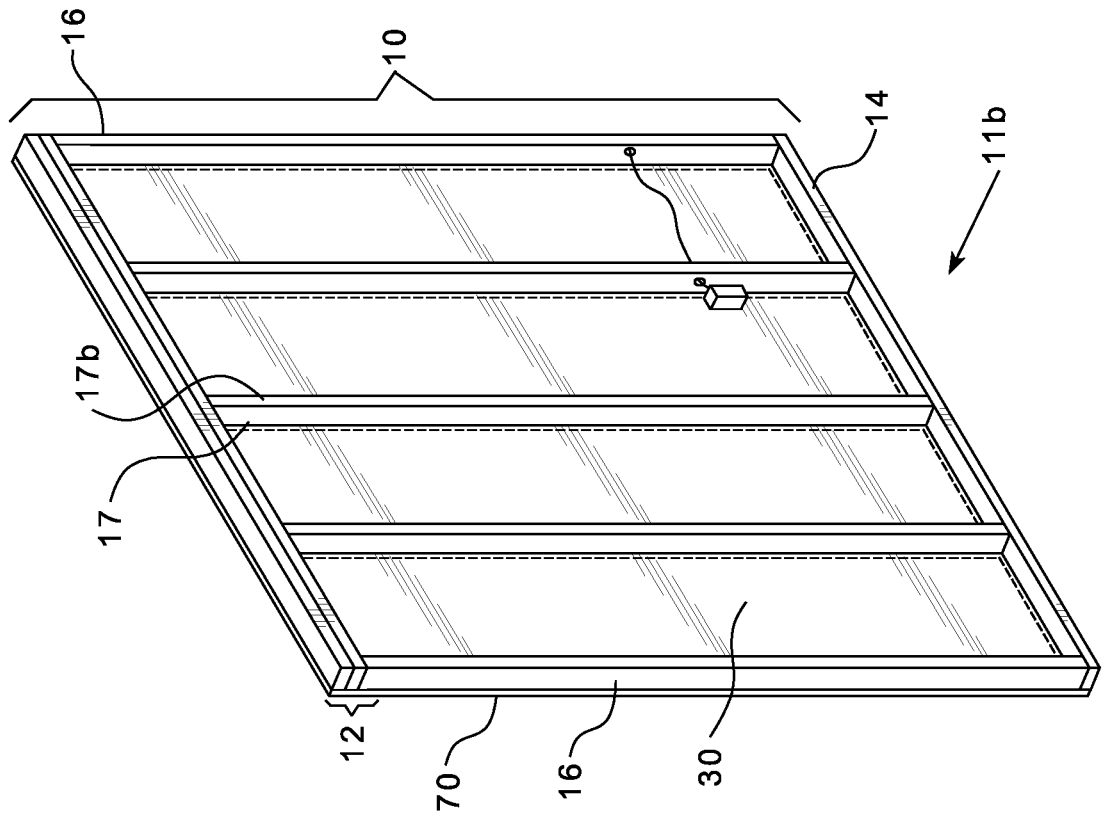
FIG. 8 is a vertical cross-sectional view of the foam wall structure of FIG. 5.
Figure 7:
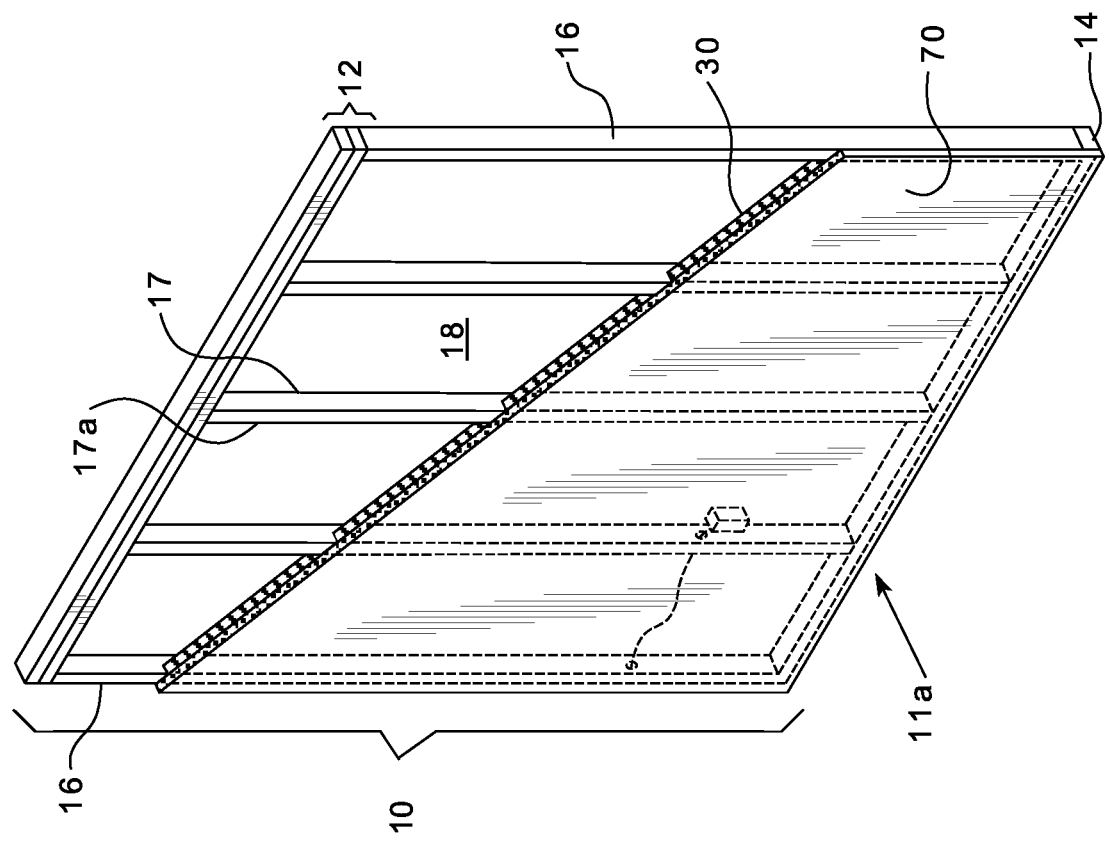
FIG. 7 is a horizontal cross-sectional view of the foam wall structure of FIG. 5.

The frame 11 can be constructed into different shapes depending on its intended use. For example, as shown in FIGS. 1 and 2, the frame 11 can be constructed as a conventional industry standard rectangular or square frame 11. The first member 12 and the second member 14 may be spaced apart and extend parallel to each other, and the connecting members 16 may extend perpendicular to the first member 12 and the second member 14 so as to from a rectangular or square frame 11. The shape and design of the frame 11 is not so limited and can be constructed into any desired shape. Generally, the shape and design of the frame 11 is constructed in accordance with the floor plans designed for a particular home or building.

Referring to FIGS. 11 and 12, at least one other connecting member (i.e., a member connecting the first member 12 to the second member 14), such as primary support member 17, may be positioned between the connecting members 16. The primary support members 17 may extend between the first member 12 and the second member 14. The primary support members 17 may define a front primary support surface 17a and a rear primary support surface 17b. As shown in FIGS. 11 and 12, the front primary support surface 17a and the rear primary support surface 17b correspond to the front frame surface 11a and the rear frame surface 11b of the frame 11. The primary support members 17 may be spaced apart. Cavities 18 may be defined by the space formed within the frame 11 between the primary support members 17, the connecting members 16, the first member 12, and/or the second member 14. The size of each cavity 18 can vary based on the size of the frame 11, the distance between consecutively positioned primary support members 17, and the number of primary support members 17 present, if any. The primary support members 17, the connecting members 16, the first member 12, and/or the second member 14 may comprise one or more plates, panels, beams, studs, or the like. For example, as shown in FIGS. 9-12, the first member 12 may include two beams, although it will be appreciated that more than two beams could be used, if desired.

The connecting members 16, 17 may be fixedly engaged to the first member 12 and the second member 14. For example, the connecting members 16, 17 may be fixedly engaged to the first member 12 and the second member 14 with fasteners. Suitable fasteners include, but are not limited to, nails, nail plates, staples, bolts, screws, and rivets. The first member 12, the second member 14, the connecting members 16, 17 can be made of various materials, such as wood, metal, fiberglass, plastic, wood-polymer composite materials, or a combination of any thereof. The first member 12, the second member 14, the connecting members 16, 17 can be made of the same material or different materials.

The dimensions of the first member 12, the second member 14, the connecting members 16, 17 can vary depending on the intended use of the frame 11. The first member 12, the second member 14, the connecting members 16, 17 can each have any dimension. The first member 12, the second member 14, the connecting members 16, 17 can have the same dimensions. For example, the first member 12, the second member 14, the connecting members 16, 17 may have the same thickness and width dimensions, and the same or different length dimensions. For example, the first member 12, the second member 14, the connecting members 16, 17 can all have a thickness and width and height dimension of nominally 2×4 inches. In another example, the first member 12, the second member 14, the connecting members 16, 17 can all have thickness and width dimensions of nominally 2×6 inches.

The first member 12, the second member 14, and the side members 16 can have the same dimensions, which may be different than the dimensions of the primary support members 17. For example, the first member 12, the second member 14, and the side members 16 may have the same thickness and width dimensions, and the primary support members 17 may have thickness and/or width dimensions that may be different than the dimensions of the first member 12, the second member 14, and the side members 16. For example, the first member 12, the second member 14, and the side members 16 can have thickness and width dimensions of nominally 2×6 inches, and the primary support members 17 can have thickness and width dimension of nominally 2×4 inches.

In the embodiment of the wall structure depicted in FIGS. 9-12, foam panel 70 overlies front frame surface 11a such that foam panel 70 abuts front frame surface 11a to thereby, along with first member 12, the second member 14, and the connecting members 16, 17, define the cavity 18.

As used in this specification, the term "foam panel" refers to panels comprising foam, such as, for example, polyisocyanurate (sometimes referred to as "polyiso") foam panels, expanded polystyrene foam panels, and extruded polystyrene foam panels. As will be appreciated, such foam panels have relatively low fastener pull-out strength as compared to wood panels, plywood panels, and OSBs. Accordingly, "foam panel" as used in this specification, is to be distinguished from wood panels, plywood panels, and OSBs, for example. As used herein, "foam" refers to a substance that is formed by trapping pockets of gas in a liquid or solid. In certain embodiments, the foams described in this specification are "closed-celled" foams. The term "closed-celled foam", as used in this specification, means that the foam has a closed cell content of at least 80%, sometimes at least 90%, when measured according to ASTM D6226-15, which is incorporated herein by reference. In certain embodiments, the foams described in this specification are "rigid" foams. The term "rigid foam" refers to a foam having a ratio of compressive strength to tensile strength of at least 0.5:1, elongation of less than 10%, and a low recovery rate from distortion and a low elastic limit, as described in "Polyurethanes: Chemistry and Technology, Part II Technology," J. H. Saunders & K. C. Frisch, Interscience Publishers, 1964, page 239, which is incorporated herein by reference. The term "panel", as used in this specification, refers to a solid, relatively thin and flat slab of material, which in some cases, has a rectangular or square shape. In some embodiments, the foam panels described herein have a thickness of no more than 2 inches (5.08 cm), such as a thickness of 1 to 2 inches (2.54 to 5.08 cm) or 1 to 1.5 inches (2.54 cm to 3.81 cm).

The foam panel 70 can comprise a facer on a rear face and/or a front face of a core foam layer. Thus, as will be appreciated, in these implementations, a facer on the rear face of the core foam layer of the foam panel 70 abuts and overlies front frame surface 11a. In this specification, such a facer is to be understood to be a distinct component that forms part of foam panel 70 and is not a non-foam sheathing 90.

For example, the foam panel 70 may comprise a polyiso panel comprising a polyisocyanurate foam core layer and a facer attached to a front face and/or a rear face of the polyisocyanurate foam core layer. In certain implementations, the facer is attached to and substantially covers both sides (the front and rear faces) of a polyisocyanurate foam core layer or other foam core layer. For example, facers can comprise glass mats filled with recycled cardpanel and colored with carbon black. Facers can also comprise foil or foil/glass composites. Facers can also comprise fibrous materials such as fiberglass materials or other fiber-reinforced sheet-like materials. Examples of suitable facers include, but are not limited to, fiberglass mats, glass fiber-reinforced cellulosic felts, coated and polymer-bonded fiber mats (e.g., fibrous glass mats bonded with an organic polymer binder and coated with an organic polymer coating, clay, or other inorganic coating), foils (e.g., aluminum foil), coated foils, foil/membrane laminates, foil/glass composites, and polyolefin films (such as TYVEK® materials, available from DuPont; or TYPAR® materials, available from Fiberweb, Inc.). If a polyiso panel or other type of foam panel comprises a facer on both the front and rear faces of the polyisocyanurate foam layer or other core layer, then the facer on the front face may be the same as or may be different than the facer on the rear face. In some implementations, the facer acts as a water-resistant barrier. In some implementations, the facer meets the requirements as described in ASTM D226/D226M-09: Standard Specification for Asphalt-Saturated Organic Felt Used in Roofing and Waterproofing; or ASTM E2556/E2556M-10: Standard Specification for Vapor Permeable Flexible Sheet Water-Resistive Barriers Intended for Mechanical Attachment; or otherwise qualifies as a water-resistive barrier in accordance with International Residential Code (IRC) 703.2 (2012), which are each incorporated by reference into this specification. For embodiments in which the foam panel comprises a polyiso panel, the foam panel may meet the requirements of ASTM C1289-15: Standard Specification for Faced Rigid Cellular Polyisocyanurate Thermal Insulation Panel, which is incorporated by reference into this specification.

The foam panel 70 is typically fastened to front frame surface 11a. The foam panel 70 can be fastened to front frame surface 11a with fasteners and/or an adhesive. Mechanical fasteners can include, but are not limited to, nails, staples, screws, bolts, or rivets, or a combination of any thereof. In some implementations, foam panel 70 is fastened to front frame surface 11a by using mechanical fasteners. Alternatively, or in addition, foam panel may be fastened to front frame surface 11a using a construction adhesive that is compatible with the adjoining materials. For example, an adhesive used to fasten a foam panel 70 to front frame surface 11a can comprise a foam material (which may be the same foam material or a different foam material as the foam material comprising the foam layer, described below).

According to the various wall structures of this specification, a foam layer 30 is located within cavity 18. The foam layer 30 adheres to a rear surface of non-foam sheathing 90, when non-foam sheathing 90 is present, and/or adheres to a rear surface of foam panel 70, when non-foam sheathing 90 is not present and covers at least a portion of the rear surface of the non-foam sheathing 90 and/or foam panel 70. In certain implementations, the foam layer 30 does not extend out from and/or overlie the front frame surface 11a.

More specifically, according to the wall structures of this specification, foam layer 30 comprises a polyurethane foam layer that has a density, as determined by ASTM D1622-14, of at least 44 kg/m$^3$ (2.75 lb/ft$^3$), at least 48 kg/m$^3$ (3.0 lb/ft$^3$), or at least 51 kg/m$^3$ (3.2 lb/ft$^3$). In some cases, foam layer 30 has a density, as determined by ASTM D1622-14, of no more than 160 kg/m$^3$ (10.0 lb/ft$^3$), such as no more than 80 kg/m$^3$ (5.0 lb/ft$^3$), or no more than 60 kg/m$^3$ (3.75 lb/ft$^3$). Polyurethane foam layer 30 is typically a closed-cell foam, which, as used herein, means that the foam has a closed cell content of at least 80% by volume, such as at least 85% by volume, or at least 90% by volume, measured according to ISO 4590:2002. Moreover, polyurethane foam layer 30 has a Class A rating (flame spread index of no more than 25 and smoke development index of no more than 450), determined according to the ASTM E 84 test. More particularly, it was discovered, surprisingly, that, in some implementations, polyurethane foam layer 30 may have such a Class A rating at a foam thickness of 4 inches, which can classify the foam as a Class A at an unlimited foam thickness.

In the wall structures of this specification, polyurethane foam layer 30 is the cured reaction product of a polyurethane foam-forming composition comprising: a polyisocyanate, an aromatic polyester polyol having a functionality of greater than 2.5 and an OH number of at least 300 mg KOH/g, which is present in an amount of at least 50% by weight, based on the total weight of the polyurethane foam-forming composition less the weight of the polyisocyanate; a catalyst, and a blowing agent composition. The blowing agent composition comprises water; and a hydrofluoroolefin.

As indicated, the polyurethane foam-forming composition used to form polyurethane foam layer 30 comprises a polyisocyanate. As used in this specification, the term "polyisocyanate" is meant to encompass diisocyanates as well as higher functionality isocyanates. Any of the known organic polyisocyanates may be used in the present invention. Suitable polyisocyanates include aromatic, aliphatic and cycloaliphatic polyisocyanates and combinations thereof. Representative of these types are diisocyanates, such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,4-cyclohexane diisocyanate, pentamethylene 1,5-diisocyanate, the isomers of hexahydrotoluene diisocyanate, 1,5-naphthylene diisocyanate, 1-methylphenyl-2,4-phenyl diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate, and 3,3'-dimethyldiphenylpropane-4,4'-diisocyanate; triisocyanates, such as 2,4,6-toluene triisocyanate; and polyisocyanates, such as 4,4'-dimethyl-diphenylmethane-2,2',5,5'-tetraisocyanate and the polymethylene polyphenylisocyanates.

A crude polyisocyanate may be used, such as the crude toluene diisocyanate obtained by the phosgenation of a mixture of toluene diamines. Similarly, undistilled polyisocyanates, such as methylene bridged polyphenyl-polyisocyanates can be used and can be obtained by phosgenation of polyphenylpolymethylenepolyamines obtained by the condensation of aromatic amines, such as aniline, with formaldehyde.

Suitable modified polyisocyanates may be obtained by chemical reaction of polyisocyanates and can include, without limitation, isocyanates containing ester groups, urea groups, biuret groups, allophanate groups, carbodiimide groups, isocyanurate groups, uretdione groups and/or urethane groups.

In certain embodiments, the polyisocyanate comprises a methylene-bridged polyphenyl polyisocyanate and/or a prepolymer of a methylene-bridged polyphenyl polyisocyanate having an average functionality of 2.0 to 3.5, such as 2.1 to 3.1, isocyanate moieties per molecule, and a free NCO content of 15 to 35% by weight, such as 20 to 35% by weight, 25 to 35% by weight or, in some cases, 28 to 34% by weight. In certain embodiments, such methylene-bridged polyphenyl polyisocyanate and/or a prepolymer of a methylene-bridged polyphenyl polyisocyanate is present in an amount of at least 50% by weight, such as at least 80% by weight, at least 90% by weight, or at least 99% by weight, based on the total weight of polyisocyanate.

The polyurethane foam-forming composition used to form polyurethane foam layer 30 include, among other things, an aromatic polyester polyol. More specifically, such polyurethane foam-forming compositions include an aromatic polyester polyol having a functionality of greater than 2.5 and an OH number of at least 300 mg KOH/g. In some implementations, the foregoing aromatic polyester polyol has a functionality of at least 2.7, such as 2.7 to 3.2 or 2.8 to 3.2. In some implementations, the foregoing aromatic polyester polyol has an OH number of 300 to 400 mg KOH/g, 300 to 380 mg KOH/g, or, in some cases 360 to 380 mg KOH/g.

The foregoing aromatic polyester polyol having a functionality of greater than 2.5 and an OH number of at least 300 mg KOH/g is present in an amount of at least 50% by weight, based on the total weight of the polyurethane foam-forming composition, less the weight of the polyisocyanate. In some implementations, the foregoing aromatic polyester polyol having a functionality of greater than 2.5 and an OH number of at least 300 mg KOH/g is present in an amount of 50 to 90% by weight, 50 to 80% by weight, 50 to 75% by weight, 65 to 75% by weight, or, in some cases, 70 to 75% by weight, based on the total weight of the polyurethane foam-forming composition, less the weight of the polyisocyanate.

Suitable aromatic polyester polyols include, for example, typical transesterification or direct esterification reaction products of an acid or anhydride thereof with a polyol. More specifically, in some implementations, the foregoing aromatic polyester polyol comprises a transesterification or direct esterification reaction product of a reaction mixture comprising polyol, such as glycol and a higher functionality polyols, and a terephthalate source.

Specific examples of polyols suitable for use in preparing the foregoing aromatic polyester include, without limitation, di- and higher functional polyols having a molecular mass of from 62 g/mol to 400 g/mol. Specific examples of such polyols include, without limitation, 1,4-dihydroxycyclohexane, 1,2-propanediol, 1,3-propanediol, 2-methyl-1,3-propanediol, 1,5-pentanediol, 1,6-hexanediol, 1,8-octanediol, neopentyl glycol, ethylene glycol, diethylene glycol, triethylene glycol, tetraethylene glycol, dipropylene glycol, tripropylene glycol, dibutylene glycol, tripropylene glycol, glycerol, sorbitol, pentaerythritol, trimethylolpropane, natural vegetable oils, modified natural vegetable oils, fatty acid derivatives of vegetable oil, and including mixtures of two or more of any of the foregoing.

Specific examples of suitable sources of terephthalate include, without limitation, polyethylene terephthalate (PET), industrial recycled PET, post-consumer PET, terephthalic acid (TA), industrial recycled TA (BACA), phthalic anhydride, iso-phthalic acid or meta-phthalic acid.

In some specific examples, the reaction mixture may comprise 45 to 70% by weight of a glycol, 20 to 35% by weight a terephthalate source, and 5 to 20% by weight glycerin, based on the total weight of the reaction mixture used to produce the aromatic polyester polyol.

Specific examples of commercially available aromatic polyester polyols that are suitable for use in the polyurethane foam-forming composition used to form polyurethane foam layer 30 include ISOEXTER TB-306 commercially available from Coim and TEROL 649 commercially available from Huntsman.

The polyurethane foam-forming composition used to form polyurethane foam layer 30 can also comprise other isocyanate-reactive components, such as any of a variety of polyether polyols. In certain embodiments, however, the polyurethane foam-forming composition is substantially or, in some cases, completely free of polyether polyols. In fact, it was observed that the relatively high density (2.8 lb/ft3 or more) polyurethane foam layer 30 could be produced that are dimensionally-stable even without using relatively high-functionality (functionality of at least 5.0) sucrose-based polyether polyols that are commonly employed to provide such dimensional stability to polyurethane spray foams. The absence of such sucrose-based polyether polyols is advantageous for improving the smoke development properties of the polyurethane foam layer 30.

As used herein, "substantially free", when used with reference to the absence of polyether polyol, means that polyether polyol is present, if at all, in an amount of less than 5% by weight, no more than 2% by weight, or, in some cases, no more than 1% by weight, based on the total weight of the polyurethane foam-forming composition, less the weight of the polyisocyanate.

In certain embodiments, the polyurethane foam-forming compositions comprises a compound, often a monomeric compound, having at least two isocyanate-reactive hydrogen atoms and a molecular weight of from 32 to 399, which can act, for example, as a chain extender/crosslinker. These compounds often contain from 2 to 8, such 2 to 4, isocyanate-reactive hydrogen atoms. Specific examples of which include, but are not limited to, ethanolamine, diethanolamine, triethanolamine, sorbitol and/or glycerol.

In certain embodiments, the foregoing chain extender/crosslinker is present in an amount of 1 to 10% by weight, such as 1 to 5% by weight, or 2 to 3% by weight, based on the total weight of isocyanate-reactive components in the isocyanate-reactive composition. Moreover, in certain embodiments, chain extender/crosslinker is present in an amount of 0.5 to 5% by weight, such as 0.5 to 2% by weight, or 1 to 2% by weight, based on the total weight of the polyurethane foam-forming composition. In fact, it was another surprising discovery that the amount of chain extender/crosslinker could be greatly reduced relative to prior Class A polyurethane spray foams of similar density, which served to reduce reduce void formation, internal blistering, and surface cracking of the foam.

The polyurethane foam-forming composition used to form polyurethane foam layer 30 also includes a blowing agent composition. The blowing agent composition comprises water. In certain of these embodiments, water is present in an amount of 0.5 to 2% by weight, such as 0.8 to 1.5% by weight, or, in some cases, 1 to 1.5% by weight, based on the total weight of the polyurethane foam-forming composition, less the weight of the polyisocyanate.

The blowing agent composition also includes a hydrofluoroolefin, such as a $C_2$ to $C_6$ hydrohalogenated olefin. As used herein, "$C_2$ to $C_6$ hydrohalogenated olefin" refers to a compound having 2 to 6 carbon atoms, at least one halogen atom, at least one hydrogen atom, and at least one carbon-carbon double bond. In certain embodiments, the $C_2$ to $C_6$ hydrohalogenated olefin has a boiling point of at least 10° C., such as 10° C. to 40° C. or 14° C. to 40° C., at 1 atmosphere pressure.

In certain embodiments, the $C_2$ to $C_6$ hydrohalogenated olefin comprises fluorine and, in such cases, the $C_2$ to $C_6$ hydrohalogenated olefin is a hydrofluoroolefin or HFO. In certain of these embodiments, the halogen also comprises chlorine and, in such cases, the $C_2$ to $C_6$ halogenated olefin is a hydrofluorochloroolefin or HFCO.

Suitable HFOs include, without limitation, any of the isomers of 1,1,1,4,4,4-hexafluoro-2-butene ($CF_3CHCHCF_3$), such as the cis- and trans-forms of 1,1,1,4,4,4-hexafluoro-2-butene, as well as mixtures thereof. In some cases, for example, a blend of cis-1,1,1,4,4,4-hexafluoro-2-butene and trans-1,1,1,4,4,4-hexafluoro-2-butene may be used in which the cis-isomer is present in an amount of 1 to 99% by weight, 10 to 90% by weight, or 20 to 80% by weight and the trans-isomer is present in an amount of 99 to 1% by weight, 90 to 10% by weight, or 80 to 20% by weight, based on the total weight of 1,1,1,4,4,4-hexafluoro-2-butene that is present.

In some embodiments, the $C_2$ to $C_6$ hydrohalogenated olefin comprises a compound having the structure:

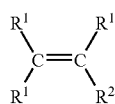

wherein each $R^1$, which may be the same or different, is chlorine, fluorine, bromine, iodine or hydrogen, with the proviso that at least one $R^1$ is hydrogen, $R^2$ is $(CR^1_2)_nX$, X is $CR^1F_2$, and n iso, 1, 2, or 3.

In certain embodiments, the $C_2$ to $C_6$ hydrohalogenated olefin comprises a $C_3$ to $C_4$ hydrohalogenated olefin, such as a compound of the above structure in which n is 0, at least one $R^1$ is H, at least one other $R^1$ is chlorine, and X is $CF_3$. Trifluoro, monochloropropenes are examples of such compounds. Suitable trifluoro, monochloropropenes include, for example, 1,1,1-trifluoro-2,chloro-propene (HFCO-1233xf) and both cis- and trans-1,1,1-trifluoro-3-chloropropene (HFCO-1233zd). The term HFCO-1233zd herein encompasses both the cis- and trans-forms of 1,1,1-trifluo-3,chloropropene, including various mixtures thereof. The terms "cisHFCO-1233zd" and "transHFCO-1233zd" are used herein to describe the cis- and trans-forms of 1,1,1-trifluo, 3-chlororopropene, respectively. In certain embodiments, transHFCO-1233zd is predominantly (at least 90 percent by weight, based on the total weight of HFCO-1233zd) or exclusively used.

In certain embodiments, the $C_2$ to $C_6$ halogenated olefin is present in an amount of 1 to 6% by weight, such as 3 to 6% by weight, or 5 to 6% by weight, based on the total weight of the polyurethane foam-forming composition, less the weight of the polyisocyanate.

Moreover, in some implementations of the polyurethane foam-forming composition used to form foam layer 30, the hydroflouroolefin and water are present in a relative ratio, by weight, of 4:1 to 8:1, such as 4:1 to 6:1 or 4:1 to 5:1.

As will be appreciated, other blowing agents, such as carbon dioxide, hydrocarbons, such as n-pentane, cyclopentane, and isopentane, and/or polyfluoroalkanes, could be used if desired. In some implementations, however, the polyurethane foam-forming composition used to form foam layer 30 is substantially, or, in some cases, completely free of such other blowing agent. As used herein, "substantially free", when used with reference to the absence of a blowing agent, means that such other blowing agent is present, if at all, in an amount of no more than 5% by weight or, in some cases, no more than 1% by weight, based on the total weight of the blowing agent composition.

As indicated earlier, in certain embodiments, the amount of blowing agent used is such that the resulting polyurethane foam layer 30 has a density, as determined by ASTM D1622-14, of at least 44 kg/m$^3$ (2.75 lb/ft$^3$), at least 48 kg/m$^3$ (3.0 lb/ft$^3$), or at least 51 kg/m$^3$ (3.2 lb/ft$^3$), and no more than 160 kg/m$^3$ (10.0 lb/ft$^3$), such as no more than 80 kg/m$^3$ (5.0 lb/ft$^3$), or no more than 60 kg/m$^3$ (3.75 lb/ft$^3$).

Other ingredients can be included in the polyurethane foam-forming composition. In certain embodiments, the polyurethane foam-forming composition comprises a flame retardant. Suitable flame retardants include, but are not limited to, brominated flame retardants, such as a brominated polyol and (ii) a phosphonated flame retardants, such as a halogenated, such as chlorinated, phosphates, includes mixtures thereof.

In addition, in some embodiments, the polyurethane foam-forming composition comprises a surfactant to, for example, stabilize the foaming reaction mixture until it obtains rigidity. Such surfactants often comprise a liquid or solid organosilicon compound, a polyethylene glycol ether of a long chain alcohol, a tertiary amine, an alkanolamine salt of a long chain alkyl acid sulfate ester, an alkylsulfonic ester, or an alkylarylsulfonic acid, or a mixture thereof. Often, 0.5 to 10 parts by weight of the surfactant per 100 parts of the isocyanate-reactive composition is used.

One or more catalysts are also often used in the polyurethane foam-forming composition. Any suitable urethane catalyst may be used including the known tertiary amine compounds and organometallic compounds. Examples of suitable tertiary amine catalysts include, without limitation, triethylenediamine, N-methylmorpholine, pentamethyl diethylenetriamine, dimethylcyclohexylamine, tetra-methylethylenediamine, 1-methyl-4-dimethylaminoethyl-piperazine, 3-methoxy-N-dimethyl-propylamine, N-ethylmorpholine, diethylethanol-amine, N-cocomorpholine, N,N-dimethyl-N',N'-dimethylisopropyl-propylene diamine, N,N-diethyl-3-diethyl aminopropylamine and dimethyl-benzyl amine. Examples of suitable organometallic catalysts include, without limitation, organomercury, organolead, organobismuth, organozinc, organoferric and organotin catalysts. Suitable organotin catalysts include, without limitation, tin salts of carboxylic acids such as dibutyltin di-2-ethyl hexanoate and dibutyltin dilaurate. Metal salts such as stannous chloride can also function as catalysts for the urethane reaction. A catalyst for the trimerization of polyisocyanates, such as an alkali metal alkoxide or carboxylate, or certain tertiary amines may also optionally be employed herein. Such catalysts are used in an amount which measurably increases the rate of reaction of the polyisocyanate. Typical amounts are 0.1 to 10.0 part of catalyst per 100 parts by weight of polyol. Examples of such catalysts include the potassium salts of carboxylic acids such as potassium octoate, and the tertiary amine N,N',N''-tris(3-dimethylaminopropyl) hexahydro-s-triazine.

Other suitable ingredients, if desired, include reaction retarders, cell regulators, emulsifiers, foam stabilizers, colorants, such as pigments and dyes, and fillers, such as, but not limited to, barium sulfate and calcium carbonate.

In certain embodiments, the polyurethane foam-forming composition is formed by combining the polyisocyanate with an isocyanate-reactive composition (comprising all other components of the polyurethane foam-forming composition) in a relative volume ratio of 1.5:1 to 1:1.5, such as 1.1:1 to 1:1.1. In certain embodiments, the polyisocyanate and isocyanate-reactive composition are combined in relative amounts such that the NCO Index (ratio of isocyanate groups to isocyanate-reactive groups multiplied by 100) is 70 to 150, 90 to 150, 90 to 135, 100 to 135 or 100 to 120.

As illustrated in the Figures, in some embodiments, foam layer 30 has a thickness extending from the rear surface of sheet metal sheathing 90 to a position intermediate the front frame surface 11a and the rear frame surface 11b. In this manner, a gap 40 may be formed within the frame 11 between a rear surface of the foam layer 30 and the rear frame surface 11b. Although the Figures show the foam layer 30 comprising a thickness extending from the rear surface of sheet metal sheathing 90 to a position intermediate the front frame surface 11a and the rear frame surface 11b, it is understood that the foam layer 30 can alternatively comprise a thickness extending from the rear surface of sheet metal sheathing 90 to the rear frame surface 11b, in which case there may be no gap formed within the frame 11 between the rear surface of the foam layer 30 and the rear frame surface 11b. In some embodiments, gap 40 has a width, from the rear surface of the foam layer to the rear frame surface 11b, of at least 1 inch (2.54 cm), such as 1 to 2 inches (2.54 to 5.08 cm) or 1.5 to 2 inches (3.81 to 5.08 cm).

This specification also relates to methods for manufacturing foam wall structures. The methods comprise depositing a polyurethane foam-forming composition of the type described in this specification into a cavity of the wall structure to form a polyurethane foam layer of the type described earlier in the cavity that adheres to a rear surface of either (i) a foam panel that abuts a front surface of a frame of the wall structure, the frame being formed by a front surface of a first member, a front surface of a second member that is spaced apart from the first member, and a front surface of connecting members extending between the first member and the second member, wherein the foam panel, the first member, the second member, and the connecting members define the cavity, and/or (ii) a non-foam sheathing that abuts the front frame surface between the front frame surface and the foam panel, wherein the non-foam sheathing, the first member, the second member, and the connecting members define the cavity.

For example, in some implementations, foam panel 70 and/or non-foam sheathing 90 can be mechanically fastened to the front frame surface 11a while the frame 11 is positioned substantially horizontally, such as where the frame 11 is positioned on a framing table where the frame 11 may be constructed. As used herein, the phrase "substantially horizontal" when used with reference to the position of the frame when the foam panel is attached means that the longest dimension of each of the frame members 12, 14, 16 and 17 is positioned generally horizontally, though modest deviations from true horizontal of to 30°, in some cases up to 20° or up to 10° are also encompassed by the term "substantially horizontal".

The framing table may hold the frame members in the required position while they are attached to each other using suitable fasteners. A framing table can help ensure that frame members are attached to each other at the perpendicular and parallel positions to each other (if desired) and therefore can also ensure that the sheet metal sheathing 90 and foam panel 70 when attached to the frame 11 are installed in the same plane. This means that the surfaces 12a, 14a, 16a, 17a, are in the same plane and flat and flush so that the gap between these surfaces and the sheet metal sheathing 90 and the foam panel 70 is minimized; making it easier to attach the sheet metal sheathing 90 and foam panel 70 in the desired position on the frame 11.

In certain implementations, after ensuring correct attachment of the framing members, the frame 11 may, if desired, be moved on to a tilting device, such as a tiltable platform. Such a tilting device receives the frame 11 in a substantially horizontal position and is capable of placing the frame 11 having the foam panel 70, and optionally also non-foam sheathing 90, fastened thereto on a conveyor configured to convey the frame 11 having the foam panel 70 fastened thereto in a substantially upright position. In some embodiments, frame 11 may rest on a tiltable platform that is oriented substantially horizontally while the foam panel 70, and optionally non-foam sheathing 90, are fastened to the front frame surface 11a of the frame 11.

In some implementations, non-foam sheathing 90 is mechanically fastened to the front frame surface 11a. The non-foam sheathing 90 can be mechanically fastened to any of the front faces (12a, 14a, 16a and/or 17a) of the constituent members (12, 14, 16, and 17) of the frame 11. For example, the non-foam sheathing 90 can be mechanically fastened to the front faces 12a and 14a of the first and second members 12 and 14 and/or to the front faces 16a, 17a of the connecting members 16, 17 extending therebetween. The non-foam sheathing 90 can be mechanically fastened to the front frame surface 11a with mechanical fasteners 92 (see the Figures). Attachment fasteners can include, but are not limited to, nails (as depicted in the Figures), staples, screws, bolts, or rivets, or a combination of any thereof.

According certain methods of this specification, foam panel 70 is oriented so as to abut front frame surface 11a and/or abut non-foam sheathing 90, if it is present, and to overlay the front frame surface 11a.

In some implementations, the methods comprise fastening the foam panel 70 to the front frame surface 11a of, for example, a substantially horizontally positioned frame. A foam panel 70 can be fastened to the front frame surface 11a, which, in some cases, may already have a non-foam sheathing 90 fastened thereto, while the frame 11 is positioned substantially horizontally, such as where the frame 11 is on a framing table where the frame 11 may be constructed.

In certain implementations of the methods of this specification, foam panel 70 is attached to the front frame surface 11a using mechanical fasteners. Because foam panel 70 may comprise polyisocyanurate foam or foams having relatively low fastener pull-out strength, care should be used when mechanically fastening a foam panel 70 to frames so as not to damage the foam panels.

In certain implementations, foam panel 70 and/or non-foam sheathing 90 is attached to the front frame surface 11a by using fasteners, such as SCRAIL® collated nails (commercially available from FASCO America®, Muscle Shoals, Ala.) equipped with a continuous rigid insulation washer (a "CI washer"). Alternatively, the foam panel 70 and/or non-foam sheathing 90 can be fastened by the use of one or more adhesives selected from latex-based adhesives, reactive hot melts, polyester adhesives, polyamide adhesives, acrylic adhesives, one-component epoxy-based adhesives, one-component polyurethane-based adhesives, two-component polyurethane-based adhesives, and combinations of any thereof. Also, as described, a foam material may be used as the adhesive. For example, a layer of foam may be applied to the foam panel 70, before positioning and attaching the foam panel 70 to the front frame surface 11a.

The foam panel 70 may comprise multiple separate foam panels (i.e., multiple sections) which may be joined together by tape (such as is described below) or caulk or polyurethane foam at this stage or later in the process.

The methods of this specification comprise depositing a foam-forming material into the cavity so that it adheres to a rear surface 90b of the sheet metal sheathing 90 and/or a rear surface 70b of foam panel 70.

In some implementations, this step of the methods described herein comprises placing the frame 11 having the foam panel 70, and optionally non-foam sheathing 90, fastened thereto on a conveyor, such as a track conveyor that is configured to convey the frame 11 having foam panel 70 fastened thereto in a substantially upright position. As used herein, the term "track conveyor" refers to a device configured to convey frame 11 of a wall structure 10 in a substantially upright position and that includes at least one, in some cases more than one, track (or line) along which the frame 11 of a wall structure can travel and upon which the wall structure 10 can rest. The tracks included in the track conveyor utilized in the methods described in this specification can comprise any of a variety of devices to facilitate conveyance of a wall structure 10 along the track(s) in a substantially upright position, such as rollers, balls, bearings, wheels, and belts, among other devices. In some embodiments, however, the tracks of the track conveyor comprise a plurality of rotating members, such as balls (sometimes referred to as ball bearing rollers) or wheels in which the track includes a plurality of such rotating members, i.e., circular objects that revolve on an axle and upon which the frame 11 lies while being conveyed, and which are disposed along the length of the track.

In these implementations, frame 11 is, in some embodiments, placed on conveyor in a substantially upright position in which rear frame surface 11b faces away from substantially horizontally positioned track(s) of the track conveyor, so that it is completely exposed (i.e., there is no component or device between a spray foam applicator and the rear frame surface 11b, which allows for easy spray foam application over the entire wall structure, as described below), whereas front frame surface 11a faces towards, and may be in direct contact with, substantially horizontally positioned track(s).

The track conveyor is, in some implementations, configured to convey a frame 11 of a wall structure 10 in a substantially upright position. As used herein, "substantially upright position" when used with reference to the conveyance of a frame 11 of a wall structure means that the longest dimension of at least one of the frame members 12, 14, 16 and 17 is positioned generally perpendicular to the direction of gravity but not exactly perpendicular to the direction of gravity. For example, in some cases "substantially vertical" in this context means that the longest dimension of at least one of the frame members 12, 14, 16 and 17 is positioned at a slope of 75° to 88° from the direction of gravity, such as 78° to 88° from the direction of gravity, or, in some cases, 80° to 86° or 81° to 85° from the direction of gravity.

Some implementations of the methods of this specification comprise conveying the frame 11 having the foam panel 70 fastened thereto on the track conveyor, in a substantially upright position, to a spray foam application station where the polyurethane foam-forming composition described in this specification is spray applied into the cavity so that the polyurethane foam-forming composition adheres to the rear surface 70b of the foam panel 70 and/or, if present, rear surface 90b of non-foam sheathing 90 to thereby form a wall structure 10 having a polyurethane foam layer 30 deposited in the cavity 18.

Various spray application devices can be used to spray the polyurethane foam-forming composition into the cavity 18. One suitable device is a Fusion CS plural-component spray gun commercially available from Graco Inc.

In some implementations, the foam layer 30 has a thickness extending from the rear surface of the sheet metal sheathing 90 to a position intermediate the front frame surface 11a and the rear frame surface 11b. In this manner, a gap 40 is formed within the frame 11 between a rear surface of the foam layer 30 and the rear frame surface 11b. In some embodiments, the gap 40 has a width, from the rear surface of the foam layer 30b to the rear frame surface 11b, of at least 1 inch (2.54 cm), such as 1 to 4.5 inches (2.54 to 11.43 cm), 1 to 2 inches (2.54 to 5.08 cm) or 1.5 to 2 inches (3.81 to 5.08 cm). In some embodiments, the foam layer 30 is deposited as a substantially continuous layer within the cavity 18 to provide optimal insulating properties. The gap 40 can be used as an area to incorporate home utility components such as electrical wires, cords, heating and cooling pipes, and plumbing fixtures. These home utility components may be inserted into the gap 40 located between the foam layer 30 and the rear frame surface 11b such that utilities components are not surrounded by or contacting the foam layer 30. In one example, the gap 40 comprises at least two inches as measured between the foam layer 30 and the rear frame surface 11b.

The foam layer 30 is thus formed in-situ during the manufacturing process of the wall structure 10. The term "formed in-situ during the manufacturing process," as used herein, refers to the formation of a foam layer 30 as described in this specification during manufacturing of the wall structure 10 off-site at a facility remote or away from a building construction site. As such, the foam layer 30 may be formed not at a construction site as is required by conventional methods, but instead as a component of the pre-fabricated foamed wall structure 10.

The foam layer 30 is able to fill tight spaces and seal gaps that may not be visible to the naked eye. The foam layer 30 can also act as a vapor and thermal insulating barrier, which reduces energy consumption in buildings and residential homes when the wall structure 10 is used as a constituent wall panel. The foam layer 30 may provide structural stability to the wall structure 10, such as improved wall racking strength, which refers to the ability of a wall structure to maintain its shape under shear stress.

After the foam layer 30 has expanded and cured, the substantially upright positioned wall structure 10 can be conveyed out of the spray foam application station on the track conveyer. Thereafter, if desired, foam layer 30 can be deflashed to remove excess foam material, such as any foam material that is deposited on the rear frame surface 11b. Deflashing can be done while the wall structure 10 is in a substantially upright position on the track conveyer, if desired. Various devices can be used for deflashing, such as a hoe or curry comb.

In cases where the wall structure 10 comprises two or more foam panels 70 adjacent with one another, a sealant, such as a tape (or other sealant material, such as a liquid sealer) can be applied to front surfaces of the foam panels 70 and over seams formed at adjacent sides of two foam panels 70.

Various aspects of the subject matter described herein are set out in the following numbered clauses:

Clause 1. A wall structure comprising: (a) a frame comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface; (b) a foam panel overlying the front frame surface, wherein: (i) the foam panel abuts the front frame surface such that the first member, the second member, and the connecting members define a cavity, and/or (ii) a non-foam sheathing abuts the front frame surface between the front frame surface and the foam panel, such that the non-foam sheathing, the first member, the second member, and the connecting members define the cavity; and (c) a polyurethane foam layer disposed within the cavity, wherein the polyurethane foam layer: (i) adheres to a rear surface of the foam panel and/or, if present, a rear surface of the non-foam sheathing, (ii) has a density, as determined by ASTM D1622-14, of at least 44 kg/m$^3$ (2.75 lb/ft$^3$), (iii) exhibits ASTM E84-16 Class A flame spread and smoke development characteristics, and (iv) is the cured reaction product of a polyurethane foam-forming composition comprising: a polyisocyanate, an aromatic polyester polyol having a functionality of greater than 2.5 and an OH number of at least 300 mg KOH/g, which is present in an amount of at least 50% by weight, based on the total weight of the polyurethane foam-forming composition less the weight of the polyisocyanate; a catalyst, and a blowing agent composition comprising water and a hydrofluoroolefin.

Clause 2. The wall structure of clause 1, wherein the foam panel abuts the front frame surface such that the first member, the second member, and the connecting members define the cavity.

Clause 3. The wall structure of clause 1, wherein the non-foam sheathing is present and abuts the front frame surface between the front frame surface and the foam panel, such that the non-foam sheathing, the first member, the second member, and the connecting members define the cavity, wherein the non-foam sheathing comprises a mesh and/or a sheet metal sheathing having a thickness of 0.18 to 3.74 mm (0.007 to 0.147 inch).

Clause 4. The wall structure of clause 3, wherein the sheet metal sheathing comprises a ferrous metal, such as carbon steel, galvanized steel, galvannealed steel, and stainless steel, aluminum, brass, copper, tin, nickel, or titanium.

Clause 5. The wall structure of clause 3 or clause 4, wherein the sheet metal sheathing has a thickness of 0.18 to 1.11 mm (0.007 to 0.043 inch), 0.31 to 0.80 mm (0.012 to 0.031 inch), 0.31 to 0.63 mm (0.012 to 0.025 inch), or 0.31 to 0.55 mm (0.012 to 0.022 inch).

Clause 6. The wall structure of one of clause 3 to clause 5, wherein the sheet metal sheathing is fastened to the front frame surface with mechanical fasteners, such as nails, staples, screws, bolts, or rivets, or a combination of any thereof.

Clause 7. The wall structure of one of clause 3 to clause 6, wherein the sheet metal sheathing is fastened to front frame surface with an adhesive, such as a foam material, such as the foam layer.

Clause 8. The wall structure of one of clause 3 to clause 7, wherein the foam panel abuts a front surface of the sheet metal sheathing Clause 9. The wall structure of one of clause 1 to clause 8, wherein the foam panel comprises polyisocyanurate foam or polystyrene foam.

Clause 10. The wall structure of one of clause 1 to clause 9, wherein the foam panel comprises closed-cell foam having a closed cell content of at least 80% or at least 90%, when measured according to ASTM D6226-15.

Clause 11. The wall structure of one of clause 1 to clause 10, wherein the foam panel comprises rigid foam having a ratio of compressive strength to tensile strength of at least 0.5:1 and an elongation of less than 10%.

Clause 12. The wall structure of one of clause 1 to clause 11, wherein the foam panel has a thickness of no more than 2 inches (5.08 cm), of 1 to 2 inches (2.54 to 5.08 cm) or of 1 to 1.5 inches (2.54 cm to 3.81 cm).

Clause 13. The wall structure of one of clause 1 to clause 12, wherein the foam panel comprises a facer on a rear face and/or a front face of a core foam layer, such as where the facer is attached to and substantially covers both sides (the front and rear faces) of a core foam layer.

Clause 14. The wall structure of clause 13, wherein the facer comprises a glass mat filled with recycled cardpanel and colored with carbon black, a fiberglass mat, a glass fiber-reinforced cellulosic felt, a coated and polymer-bonded fiber mat, a foil, such as aluminum foil, a coated foil, a foil/membrane laminate, a foil/glass composite, or a polyolefin film.

Clause 15. The wall structure of clause 13 or clause 14, wherein the facer meets the requirements described in ASTM D226/D226M-09: Standard Specification for Asphalt-Saturated Organic Felt Used in Roofing and Waterproofing; or ASTM E2556/E2556M-10: Standard Specification for Vapor Permeable Flexible Sheet Water-Resistive Barriers Intended for Mechanical Attachment; or otherwise qualifies as a water-resistive barrier in accordance with International Residential Code (IRC) 703.2 (2012).

Clause 16. The wall structure of one of clause 1 to clause 15, wherein the foam panel is fastened to the front frame surface with mechanical fasteners, such as nails, staples, screws, bolts, or rivets, or a combination of any thereof, and/or an adhesive.

Clause 17. The wall structure of one of clause 1 to clause 16, wherein the polyurethane foam layer does not extend out from and/or overlie the front frame surface.

Clause 18. The wall structure of one of clause 1 to clause 17, wherein the foam layer has a thickness extending to a position intermediate the front frame surface and the rear frame surface, thereby forming a gap within the frame between a rear surface of the foam layer and the rear frame surface, such as where the gap has a width, from the rear surface of the foam layer to the rear frame surface, of at least 1 inch (2.54 cm), of 1 to 2 inches (2.54 to 5.08 cm) or of 1.5 to 2 inches (3.81 to 5.08 cm).

Clause 19. The wall structure of one of clause 1 to clause 18, wherein the aromatic polyester polyol has a functionality of at least 2.7, 2.7 to 3.2 or 2.8 to 3.2.

Clause 20. The wall structure of one of clause 1 to clause 19, wherein the aromatic polyester polyol has an OH number of 300 to 400 mg KOH/g, 300 to 380 mg KOH/g, or 360 to 380 mg KOH/g.

Clause 21. The wall structure of one of clause 1 to clause 20, wherein the aromatic polyester polyol having a functionality of greater than 2.5 and an OH number of at least 300 mg KOH/g is present in an amount of 50 to 90% by weight, 50 to 80% by weight, 50 to 75% by weight, 65 to 75% by weight, or, 70 to 75% by weight, based on the total weight of the polyurethane foam-forming composition less the weight of the polyisocyanate.

Clause 22. The wall structure of one of clause 1 to clause 21, wherein the aromatic polyester polyol having a functionality of greater than 2.5 and an OH number of at least 300 mg KOH/g comprises a transesterification or direct esterification reaction product of a reaction mixture comprising polyol, such as glycol and a higher functionality polyols, and a terephthalate source, such as where the reaction mixture comprises 45 to 70% by weight of a glycol, 20 to 35% by weight a terephthalate source, and 5 to 20% by weight glycerin, based on the total weight of the reaction mixture.

Clause 23. The wall structure of one of clause 1 to clause 22, wherein polyurethane foam-forming composition is substantially or completely free of polyether polyol.

Clause 24. The wall structure of one of clause 1 to clause 23, wherein the polyurethane foam-forming composition further comprises a compound, such as a monomeric compound, having at least two, such as 2 to 8 or 2 to 4, isocyanate-reactive hydrogen atoms and a molecular weight of from 32 to 399, such as ethanolamine, diethanolamine, triethanolamine, sorbitol, glycerol, or a mixture thereof, that is present in an amount of 1 to 10% by weight, such as 1 to 5% by weight, or 2 to 3% by weight, based on the total weight of isocyanate-reactive components in the polyurethane foam-forming composition.

Clause 25. The wall structure of one of clause 1 to clause 24, wherein water is present in the polyurethane foam-forming composition in an amount of 0.5 to 2% by weight, 0.8 to 1.5% by weight, or 1 to 1.5% by weight, based on the total weight of the polyurethane foam-forming composition less the weight of the polyisocyanate.

Clause 26. The wall structure of one of clause 1 to clause 25, wherein the hydrofluoroolefin comprises a $C_2$ to $C_6$ hydrohalogenated olefin, such as a $C_2$ to $C_6$ hydrohalogenated olefin having a boiling point of at least 10° C., such as 10° C. to 40° C. or 14° C. to 40° C., at 1 atmosphere pressure.

Clause 27. The wall structure of clause 26, wherein the $C_2$ to $C_6$ hydrohalogenated olefin comprises a hydrofluoroolefin and/or a hydrofluorochloroolefin.

Clause 28. The wall structure of clause 27, wherein the hydroflouroolefin comprises 1,1,1,4,4,4-hexafluoro-2-butene, such as the cis-form of 1,1,1,4,4,4-hexafluoro-2-butene, the trans-form of 1,1,1,4,4,4-hexafluoro-2-butene, or a mixture thereof Clause 29. The wall structure of one of clause 1 to clause 28, wherein the hydroflouroolefin is present in an amount of 1 to 6% by weight, 3 to 6% by weight, or 5 to 6% by weight, based on the total weight of the polyurethane foam-forming composition less the weight of the polyisocyanate.

Clause 30. The wall structure of one of clause 1 to clause 29, wherein the hydroflouroolefin and water are present in the polyurethane foam-forming composition in a relative ratio, by weight, of 4:1 to 8:1, 4:1 to 6:1 or 4:1 to 5:1.

Clause 31. The wall structure of one of clause 1 to clause 30, wherein the polyurethane foam-forming composition is substantially free of other blowing agents.

Clause 32. The wall structure of one of clause 1 to clause 31, wherein the catalyst comprises a tertiary amine compound, such as triethylenediamine, N-methylmorpholine, pentamethyl diethylenetriamine, dimethylcyclohexylamine, tetra-methylethylenediamine, 1-methyl-4-dimethylamino-ethyl-piperazine, 3-methoxy-N-dimethyl-propylamine, N-ethylmorpholine, diethylethanol-amine, N-cocomorpholine, N,N-dimethyl-N',N'-dimethylisopropyl-propylene diamine, N,N-diethyl-3-diethyl aminopropylamine, dimethyl-benzyl amine, or a mixture thereof.

Clause 33. The wall structure of one of clause 1 to clause 32, wherein the polyurethane foam has a density, as determined by ASTM D1622-14, of at least 44 kg/m³ (2.75 lb/ft³), at least 48 kg/m³ (3.0 lb/ft³), or at least 51 kg/m³ (3.2 lb/ft³), and no more than 160 kg/m³ (10.0 lb/ft³), no more than 80 kg/m³ (5.0 lb/ft³), or no more than 60 kg/m³ (3.75 lb/ft³).

Clause 34. The wall structure of one of clause 1 to clause 33, wherein the polyurethane foam exhibits ASTM E84-16 Class A flame spread and smoke development characteristics at a foam thickness of 4 inches.

Clause 35. A building comprising the wall structure of one of clause 1 to clause 34.

Clause 36. A method for manufacturing a wall structure comprising: depositing a polyurethane foam-forming composition into a cavity of the wall structure to form a polyurethane foam layer in the cavity that adheres to a rear surface of either (i) a foam panel that abuts a front frame surface, the front frame surface being formed by a front surface of a first member, a front surface of a second member that is spaced apart from the first member, and a front surface of connecting members extending between the first member and the second member, wherein the foam panel, the first member, the second member, and the connecting members define the cavity, and/or (ii) a non-foam sheathing that abuts the front frame surface and the foam panel, wherein the non-foam sheathing, the first member, the second member, and the connecting members define the cavity, wherein the polyurethane foam layer deposited in the cavity has a density, as determined by ASTM D1622-14, of at least 44 kg/m³ (2.75 lb/ft³) and exhibits ASTM E84-16 Class A flame spread and smoke development characteristics, and wherein the polyurethane foam-forming composition comprises: (a) a polyisocyanate, (b) an aromatic polyester polyol having a functionality of greater than 2.5 and an OH number of at least 300 mg KOH/g, which is present in an amount of at least 50% by weight, based on the total weight of the polyurethane foam-forming composition less the weight of the polyisocyanate; (c) a catalyst, and (d) a blowing agent composition comprising water; and a hydrofluoroolefin.

Clause 37. The method of clause 36, wherein the foam panel abuts the front frame surface and the polyurethane foam-forming composition is deposited into the cavity to form a polyurethane foam layer in the cavity that adheres to a rear surface of the foam panel.

Clause 38. The method of clause 36, wherein the non-foam sheathing is present and the polyurethane foam-forming composition is deposited into the cavity to form a polyurethane foam layer in the cavity that adheres to a rear surface of the non-foam sheathing, wherein the non-foam sheathing comprises a mesh and/or a sheet metal sheathing having a thickness of 0.18 to 3.74 mm (0.007 to 0.147 inch).

Clause 39. The method of clause 38, wherein the sheet metal sheathing comprises a ferrous metal, such as carbon steel, galvanized steel, galvannealed steel, and stainless steel, aluminum, brass, copper, tin, nickel, or titanium.

Clause 40. The method of clause 38 or clause 39, wherein the sheet metal sheathing has a thickness of 0.18 to 1.11 mm (0.007 to 0.043 inch), 0.31 to 0.80 mm (0.012 to 0.031 inch), 0.31 to 0.63 mm (0.012 to 0.025 inch), or 0.31 to 0.55 mm (0.012 to 0.022 inch).

Clause 41. The method of one of clause 38 to clause 40, wherein the sheet metal sheathing is fastened to the front frame surface with mechanical fasteners, such as nails, staples, screws, bolts, or rivets, or a combination of any thereof.

Clause 42. The method of one of clause 38 to clause 41, wherein the sheet metal sheathing is fastened to front frame surface with an adhesive, such as a foam material, such as the foam layer.

Clause 43. The method of one of clause 38 to clause 42, wherein the foam panel abuts a front surface of the sheet metal sheathing Clause 44. The method of one of clause 36 to clause 43, wherein the foam panel comprises polyisocyanurate foam or polystyrene foam.

Clause 45. The method of one of clause 36 to clause 44, wherein the foam panel comprises closed-cell foam having a closed cell content of at least 80% or at least 90%, when measured according to ASTM D6226-15.

Clause 46. The method of one of clause 36 to clause 45, wherein the foam panel comprises rigid foam having a ratio of compressive strength to tensile strength of at least 0.5:1 and an elongation of less than 10%.

Clause 47. The method of one of clause 36 to clause 46, wherein the foam panel has a thickness of no more than 2 inches (5.08 cm), of 1 to 2 inches (2.54 to 5.08 cm) or of 1 to 1.5 inches (2.54 cm to 3.81 cm).

Clause 48. The method of one of clause 36 to clause 47, wherein the foam panel comprises a facer on a rear face and/or a front face of a core foam layer, such as where the facer is attached to and substantially covers both sides (the front and rear faces) of a core foam layer.

Clause 49. The method of clause 48, wherein the facer comprises a glass mat filled with recycled cardpanel and colored with carbon black, a fiberglass mat, a glass fiber-reinforced cellulosic felt, a coated and polymer-bonded fiber mat, a foil, such as aluminum foil, a coated foil, a foil/membrane laminate, a foil/glass composite, or a polyolefin film.

Clause 50. The method of clause 48 or clause 49, wherein the facer meets the requirements described in ASTM D226/D226M-09: Standard Specification for Asphalt-Saturated Organic Felt Used in Roofing and Waterproofing; or ASTM E2556/E2556M-10: Standard Specification for Vapor Permeable Flexible Sheet Water-Resistive Barriers Intended for Mechanical Attachment; or otherwise qualifies as a water-resistive barrier in accordance with International Residential Code (IRC) 703.2 (2012).

Clause 51. The method of one of clause 36 to clause 50, wherein the foam panel is fastened to the front frame surface with mechanical fasteners, such as nails, staples, screws, bolts, or rivets, or a combination of any thereof, and/or an adhesive.

Clause 52. The method of one of clause 36 to clause 51, wherein the polyurethane foam layer does not extend out from and/or overlie the front frame surface.

Clause 53. The method of one of clause 36 to clause 52, wherein the foam layer is deposited so as to have a thickness extending to a position intermediate the front frame surface and the rear frame surface, thereby forming a gap within the frame between a rear surface of the foam layer and the rear frame surface, such as where the gap has a width, from the rear surface of the foam layer to the rear frame surface, of at least 1 inch (2.54 cm), of 1 to 2 inches (2.54 to 5.08 cm) or of 1.5 to 2 inches (3.81 to 5.08 cm).

Clause 54. The method of one of clause 36 to clause 53, wherein the aromatic polyester polyol has a functionality of at least 2.7, 2.7 to 3.2 or 2.8 to 3.2.

Clause 55. The method of one of clause 36 to clause 54, wherein the aromatic polyester polyol has an OH number of 300 to 400 mg KOH/g, 300 to 380 mg KOH/g, or 360 to 380 mg KOH/g.

Clause 56. The method of one of clause 36 to clause 55, wherein the aromatic polyester polyol having a functionality of greater than 2.5 and an OH number of at least 300 mg KOH/g is present in an amount of 50 to 90% by weight, 50 to 80% by weight, 50 to 75% by weight, 65 to 75% by weight, or, 70 to 75% by weight, based on the total weight of the polyurethane foam-forming composition less the weight of the polyisocyanate.

Clause 57. The method of one of clause 36 to clause 56, wherein the aromatic polyester polyol having a functionality of greater than 2.5 and an OH number of at least 300 mg KOH/g comprises a transesterification or direct esterification reaction product of a reaction mixture comprising polyol, such as glycol and a higher functionality polyols, and a terephthalate source, such as where the reaction mixture comprises 45 to 70% by weight of a glycol, 20 to 35% by weight a terephthalate source, and 5 to 20% by weight glycerin, based on the total weight of the reaction mixture.

Clause 58. The method of one of clause 36 to clause 57, wherein polyurethane foam-forming composition is substantially or completely free of polyether polyol.

Clause 59. The method of one of clause 36 to clause 58, wherein the polyurethane foam-forming composition further comprises a compound, such as a monomeric compound, having at least two, such as 2 to 8 or 2 to 4, isocyanate-reactive hydrogen atoms and a molecular weight of from 32 to 399, such as ethanolamine, diethanolamine, triethanolamine, sorbitol, glycerol, or a mixture thereof, that is present in an amount of 1 to 10% by weight, such as 1 to 5% by weight, or 2 to 3% by weight, based on the total weight of isocyanate-reactive components in the polyurethane foam-forming composition.

Clause 60. The method of one of clause 36 to clause 59, wherein water is present in the polyurethane foam-forming composition in an amount of 0.5 to 2% by weight, 0.8 to 1.5% by weight, or 1 to 1.5% by weight, based on the total weight of the polyurethane foam-forming composition less the weight of the polyisocyanate.

Clause 61. The method of one of clause 36 to clause 60, wherein the hydrofluoroolefin comprises a $C_2$ to $C_6$ hydrohalogenated olefin, such as a $C_2$ to $C_6$ hydrohalogenated olefin having a boiling point of at least 10° C., such as 10° C. to 40° C. or 14° C. to 40° C., at 1 atmosphere pressure.

Clause 62. The method of clause 61, wherein the $C_2$ to $C_6$ hydrohalogenated olefin comprises a hydrofluoroolefin and/or a hydrofluorochloroolefin.

Clause 63. The method of clause 62, wherein the hydroflouroolefin comprises 1,1,1,4,4,4-hexafluoro-2-butene, such as the cis-form of 1,1,1,4,4,4-hexafluoro-2-butene, the trans-form of 1,1,1,4,4,4-hexafluoro-2-butene, or a mixture thereof Clause 64. The method of one of clause 36 to clause 63, wherein the hydroflouroolefin is present in an amount of 1 to 6% by weight, 3 to 6% by weight, or 5 to 6% by weight, based on the total weight of the polyurethane foam-forming composition less the weight of the polyisocyanate.

Clause 65. The method of one of clause 36 to clause 64, wherein the hydroflouroolefin and water are present in the polyurethane foam-forming composition in a relative ratio, by weight, of 4:1 to 8:1, 4:1 to 6:1 or 4:1 to 5:1.

Clause 66. The method of one of clause 36 to clause 65, wherein the polyurethane foam-forming composition is substantially free of other blowing agents.

Clause 67. The method of one of clause 36 to clause 66, wherein the catalyst comprises a tertiary amine compound, such as triethylenediamine, N-methylmorpholine, pentamethyl diethylenetriamine, dimethylcyclohexylamine, tetramethylethylenediamine, 1-methyl-4-dimethylaminoethyl-piperazine, 3-methoxy-N-dimethyl-propylamine, N-ethylmorpholine, diethylethanol-amine, N-cocomorpholine, N,N-dimethyl-N',N'-dimethylisopropyl-propylene diamine, N,N-diethyl-3-diethyl aminopropylamine, dimethyl-benzyl amine, or a mixture thereof.

Clause 68. The method of one of clause 36 to clause 67, wherein the polyurethane foam has a density, as determined by ASTM D1622-14, of at least 44 kg/m³ (2.75 lb/ft³), at least 48 kg/m³ (3.0 lb/ft³), or at least 51 kg/m³ (3.2 lb/ft³), and no more than 160 kg/m³ (10.0 lb/ft³), no more than 80 kg/m³ (5.0 lb/ft³), or no more than 60 kg/m³ (3.75 lb/ft³).

Clause 69. The method of one of clause 36 to clause 68, wherein the polyurethane foam exhibits ASTM E84-16 Class A flame spread and smoke development characteristics at a foam thickness of 4 inches.

Clause 70. A building comprising a wall structure produced by the method of one of clause 36 to clause 69.

The non-limiting and non-exhaustive examples that follow are intended to further describe various non-limiting and non-exhaustive embodiments without restricting the scope of the embodiments described in this specification.

EXAMPLES

Examples 1-12

Polyol blends were prepared using the ingredients and amounts (parts by weight) listed in Table 1 below in which:

POLYOL 1 is a phthalic anhydride based polyester polyol having a hydroxyl number of 290-310 mg KOH/gram polyol and a theoretical functionality of 2.1, commercially available from Stepan Company;

POLYOL 2 is a phthalic anhydride based polyester polyol having a hydroxyl number of 340-360 mg KOH/gram polyol and a theoretical functionality of 2.4, commercially available from Stepan Company;

POLYOL 3 is an aromatic polyester polyol having a hydroxyl number of 360-380 mg KOH/gram polyol and a functionality of 3.0, commercially available as Terol® 649 from Huntsman;

POLYOL 4 is a phthalic anhydride based polyester polyol having a hydroxyl number of 311 mg KOH/gram polyol and a functionality of 2.7, commercially available as Isoexter® TB-306 from Coim;

POLYOL 5 is a sucrose/propylene glycol/water-initiated polyoxypropylene polyol having a hydroxyl number of 450-490 mg KOH/gram polyol and a functionality of 5.2;

TEA refers to Triethanolamine 99%, commercially available from Dow; TEA LFG is Triethanolamine 99% Low Freezing Grade, commercially available from Dow;

EB is ethylene glycol monobutyl ether solvent;

FR 1 is tris (1-chloro-2-propyl) phosphate flame retardant;

FR 2 is a reactive, high-bromine-content diol mixture flame retardant, commercially available as SAYTEX® RB-7980 from Albemarle;

SURFACTANT 1 is a non-hydrolyzable silicone polyether surfactant, commercially available as Silstab® 2100 from Siletch Corporation;

SURFACTANT 2 is a silicone surfactant, commercially available as VORASURF™ DC 193 from Dow;

CATALYST 1 is N,N,N',N",N"-pentamethyl-dipropylenetriamine, commercially available as Jeffcat® ZR-40 from Huntsman;

CATALYST 2 is N,N-bis(3-dimethylaminopropyl)-N-isopropanolamine, commercially available as Jeffcat® ZR-50 rom Huntsman;

CATALYST 3 is a reactive amine catalyst, commercially available as Polycat 143; CATALYST 4 is 1,2-dimethylimidazole, commercially available as DABCO® 2041 from Evonik);

CATALYST 5 is dibutyltin diisooctylmaleate, commercially available as DABCO® T125 from Evonik;

HFC is 1,1,1,3,3-Pentafluoropropane, which is also known as HFC245fa; and HFO is cis-1,1,1,4,4,4-hexafluoro-2-butene, commercially available as Opteon™ 1100 from The Chemours Company FC, LLC.

To prepare the polyol blends, all components were added to a suitable container and mixed at about room temperature. The polyol blends were spray applied to an oriented strand board (OSB) substrate framed with 2×4 dimensional lumber wall studs using a Graco HVR machine with 60 feet of heated hose using a Graco Fusion CP spray gun equipped with a 42/42 mix chamber, using a mix ratio of 1:1 by volume with Mondur® MR (a polymeric diphenylmethane diisocyanate (pMDI) having a NCO content of at least 31.0%, a viscosity of 150 to 250 mPa·s @ 25° C.; and an average equivalent weight of 132, commercially available from Covestro LLC. The following parameters were used in the spray operation: Temperature of resin and isocyanate: 85° F.; Temperature of polyol blend and isocyanate in machine: 125° F.; Temperature of machine hose: 125° F.; Set pressures of polyol blend and isocyanate in machine: 1500 psi.

Results of flammability testing are set forth in Table 1. All foams had a density of about 3 lb/ft$^3$ according to ASTM D1622-14 and were dimensionally stable.

TABLE 1

| Chemicals | Example | | | | | |
|---|---|---|---|---|---|---|
| | 1 | 2 | 3 | 4 | 5 | 6 |
| POLYOL 1 | 43.17 | 43.17 | 42.55 | — | — | — |
| POLYOL 2 | 10.79 | 10.79 | 10.64 | — | — | — |
| POLYOL 3 | — | — | — | 62.21 | 62.21 | 68.08 |
| POLYOL 4 | — | — | — | — | — | — |
| POLYOL 5 | 9.72 | 9.72 | 9.57 | 3.91 | 3.91 | — |
| TEA | — | — | — | — | — | — |
| TEA LFG | 7.09 | 7.09 | 6.99 | 6.07 | 6.07 | 4.12 |
| EB | 2.91 | 2.91 | 2.87 | 2.93 | 2.93 | 2.93 |
| FR 1 | 11.66 | 11.66 | 11.49 | 10.75 | 10.75 | 10.75 |
| FR 2 | 4.86 | 4.86 | 4.79 | 4.89 | 4.89 | 4.89 |
| SURFACTANT 1 | 1.26 | 1.26 | 1.24 | 1.27 | 1.27 | 1.27 |
| SURFACTANT 2 | — | — | — | — | — | — |
| CATALYST 1 | 0.39 | 0.39 | 0.38 | 0.14 | 0.14 | 0.14 |
| CATALYST 2 | — | 1.46 | 1.44 | 0.51 | 0.51 | 0.51 |
| CATALYST 3 | 1.46 | — | — | — | — | — |
| CATALYST 4 | 0.39 | 0.39 | 0.38 | 0.14 | 0.14 | 0.14 |
| CATALYST 5 | 0.29 | 0.29 | 0.29 | 0.10 | 0.10 | 0.10 |
| Water | — | — | — | 1.08 | 1.08 | 1.08 |
| HFC | 6 | 6.00 | — | — | — | — |
| HFO | — | — | 7.36 | 6.00 | 6.00 | 6.00 |
| Mini Tunnel Flame Spread | 15 | 25.5 | 23.5 | 24 | 23 | 21 |
| Mini Tunnel Smoke | 200 | 589 | 533.5 | 408 | 484 | 406 |

| Chemicals | Example | | | | | |
|---|---|---|---|---|---|---|
| | 7 | 8 | 9 | 10 | 11 | 12 |
| POLYOL 1 | — | — | — | — | — | — |
| POLYOL 2 | — | — | — | — | — | — |

TABLE 1-continued

| | | | | | | |
|---|---|---|---|---|---|---|
| POLYOL 3 | 65.55 | 66.77 | 69.84 | 74.49 | 73.38 | — |
| POLYOL 4 | — | — | — | — | — | 73.38 |
| POLYOL 5 | — | — | — | — | — | — |
| TEA | — | — | — | — | 1.88 | 1.88 |
| TEA LFG | 3.96 | 4.04 | 1.92 | 1.91 | — | — |
| EB | 4.71 | 4.79 | 3.83 | 3.83 | 3.77 | 3.77 |
| FR 1 | 10.35 | 10.54 | 10.54 | 7.65 | 7.54 | 7.54 |
| FR 2 | 4.71 | 4.79 | 4.79 | 2.87 | 2.83 | 2.83 |
| SURFACTANT 1 | 1.22 | 1.25 | 1.25 | 1.44 | — | — |
| SURFACTANT 2 | — | — | — | — | 1.41 | 1.41 |
| CATALYST 1 | 0.38 | 0.13 | 0.13 | 0.13 | 0.38 | 0.38 |
| CATALYST 2 | 1.41 | 0.50 | 0.50 | 0.50 | 1.41 | 1.41 |
| CATALYST 3 | — | — | — | — | — | — |
| CATALYST 4 | 0.38 | 0.13 | 0.13 | 0.13 | 0.38 | 0.38 |
| CATALYST 5 | 0.28 | 0.10 | 0.10 | 0.10 | 0.19 | 0.19 |
| Water | 1.41 | 1.20 | 1.20 | 1.20 | 1.18 | 1.18 |
| HFC | — | — | — | — | — | — |
| HFO | 5.65 | 5.75 | 5.75 | 5.74 | 5.65 | 5.65 |
| Mini Tunnel Flame Spread | 22 | 22 | 21 | 22 | 20 | 20 |
| Mini Tunnel Smoke | 384 | 387 | 345 | 306 | 350 | 325 |

Examples 13-15

In each Example, 8' (high)×4' (long) wall panels were assembled, with studs 24" on-center, and 1" Hunter PW-CG polyiso board attached to the front frame surface as continuous insulation. The polyiso board was fastened to the stud frame with button-cap nails at a frequency of 12" on the perimeter, and 24" in the field. For each example, triplicate wall panels were prepared. Spray foam was deposited at a target spray foam nominal thickness of 1.5" throughout the stud cavities, using the spray foam formulations listed in Table 2. Example 13 is a comparative example using a spray foam formulation of the type described by Example 1. Examples 14 and 15 are inventive examples using inventive foam-forming compositions similar to that described with respect to Example 11.

The wall panels were tested to determine lateral load performance by applying a horizontal load to the panel through a truss. The test used the procedures defined in ASTM E564-18, where applicable. An actuator recorded the force applied to the wall panel. The lateral load was applied to the top of the wall using a parallel chord truss. Following the loading procedures of ASTM E564-18, an ultimate lateral load for each wall was established and was used to determine the 10% preloading, one-third step, and two-thirds step loading values. Loading was applied according to ASTM E564-18. Results are listed in Table 2.

TABLE 2

| Example | Ultimate Load (lbs) | Average Ultimate Load (lbs) | Ultimate Shear Strength (plf) | Average Ultimate Shear Strength (plf) |
|---|---|---|---|---|
| 13a | 1,954 | 2,038 | 488 | 509 |
| 13b | 2,119 | | 530 | |
| 13c | 2,042 | | 510 | |
| 14a | 2,498 | 2,455 | 625 | 614 |
| 14b | 2,692 | | 673 | |
| 14c | 2,176 | | 544 | |
| 15a | 2,083 | 2,383 | 521 | 596 |
| 15b | 2,447 | | 612 | |
| 15c | 2,619 | | 655 | |

Various features and characteristics of the inventions are described in this specification to provide an overall understanding of the disclosed wall structures and method of manufacture. It is understood that the various features and characteristics described in this specification can be combined in any suitable manner regardless of whether such features and characteristics are expressly described in combination in this specification. The Applicant expressly intends such combinations of features and characteristics to be included within the scope of this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description and sufficiency of description requirements (e.g., 35 U.S.C. § 112(a) and Article 123(2) EPC). The wall structures and methods disclosed in this specification can comprise, consist of, or consist essentially of the various features and characteristics described in this specification.

Also, any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will not add new matter to the specification or claims, and will comply with written description and sufficiency of description requirements (e.g., 35 U.S.C. §§ 112(a) and Article 123(2) EPC). Additionally, numerical parameters described in this specification should be construed in light of the number of reported significant digits, the numerical precision of the number, and by applying ordinary rounding techniques. It is also understood that numerical parameters described in this specification will necessarily possess the inherent variability characteristic of the underlying measurement techniques used to determine the numerical value of the parameter.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described processes, compositions, and products. Further, the use of a singular noun includes the plural, and the use of a plural noun includes the singular, unless the context of the usage requires otherwise.

What is claimed is:

1. A wall structure comprising:
   (a) a frame comprising: (i) a first member; (ii) a second member spaced apart from the first member; and (iii) connecting members extending between the first member and the second member, wherein the first member, the second member, and the connecting members each comprise a front surface and a rear surface that form a front frame surface and a rear frame surface;
   (b) a foam panel overlying the front frame surface, wherein at least one of: (i) the foam panel abuts the front frame surface such that the foam panel, the first member, the second member, and the connecting members define a cavity, or (ii) a non-foam sheathing abuts the front frame surface between the front frame surface and the foam panel, such that the non-foam sheathing, the first member, the second member, and the connecting members define the cavity; and
   (c) a polyurethane foam layer disposed within the cavity, wherein the polyurethane foam layer:
      (i) adheres to a rear surface of at least one of the foam panel or, if present, a rear surface of the non-foam sheathing,
      (ii) has a density, as determined by ASTM D1622-14, of 44 kg/m$^3$ (2.75 lb/ft$^3$) to 160 kg/m$^3$ (10.0 lb/ft$^3$) and exhibits a Class A rating according to ASTM E84-16, and
      (iii) is a cured reaction product of a polyurethane foam-forming composition comprising:
         (1) a polyisocyanate present in an amount by weight;
         (2) an aromatic polyester polyol having a functionality of greater than 2.5 and an OH number of 300 to 400 mg KOH/g, which is present in an amount of at least 50% by weight, based on total weight of the polyurethane foam-forming composition less the weight of the polyisocyanate;
         (3) a catalyst; and
         (4) a blowing agent composition comprising water and a hydrofluoroolefin, wherein the hydrofluoroolefin is present in an amount of 1 to 6% by weight, based on the total weight of the polyurethane foam-forming composition, less the weight of the polyisocyanate.

2. The wall structure of claim 1, wherein the foam panel abuts the front frame surface such that the foam panel, the first member, the second member, and the connecting members define the cavity.

3. The wall structure of claim 1, wherein the non-foam sheathing is present and abuts the front frame surface between the front frame surface and the foam panel, such that the non-foam sheathing, the first member, the second member, and the connecting members define the cavity, wherein the non-foam sheathing comprises a sheet metal sheathing having a thickness of 0.18 to 3.74 mm (0.007 to 0.147 inch) and the foam panel abuts a front surface of the sheet metal sheathing.

4. The wall structure of claim 1, wherein the foam panel comprises a polyisocyanurate core foam layer and a facer on at least one of a rear face or a front face of the polyisocyanurate core foam layer, wherein the facer comprises a glass mat filled with recycled cardpanel and colored with carbon black, a fiberglass mat, a glass fiber-reinforced cellulosic felt, a coated and polymer-bonded fiber mat, a foil, a coated foil, a laminate comprising a foil and a membrane, a composite comprising a foil and glass, or a polyolefin film.

5. The wall structure of claim 1, wherein the polyurethane foam layer does not extend out from and overlie the front frame surface and has a thickness extending to a position intermediate the front frame surface and the rear frame surface, thereby forming a gap within the frame between a rear surface of the foam layer and the rear frame surface.

6. The wall structure of claim 1, wherein the aromatic polyester polyol having a functionality of greater than 2.5 and an OH number of 300 to 400 mg KOH/g: (i) has a functionality of 2.7 to 3.2, and (ii) is present in an amount of 65 to 75% by weight, based on total weight of the polyurethane foam-forming composition less the weight of the polyisocyanate.

7. The wall structure of claim 1, wherein the hydrofluoroolefin comprises 1,1,1,4,4,4-hexafluoro-2-butene.

8. The wall structure of claim 1, wherein the polyurethane foam has a density, as determined by ASTM D1622-14, of 51 kg/m$^3$ (3.2 lb/ft$^3$) to 80 kg/m$^3$ (5.0 lb/ft$^3$).

9. The wall structure of claim 1, wherein the water is present in an amount of 0.5 to 1.5% by weight, based on the total weight of the polyurethane foam-forming composition, less the weight of the polyisocyanate.

10. The wall structure of claim 1, wherein the polyurethane foam-forming composition further comprises a monomeric compound having 2 to 4 isocyanate-reactive hydrogen atoms and a molecular weight of from 32 to 399 that is present in an amount of 0.5 to 2% by weight, based on total weight of polyurethane foam-forming composition.

11. A method of manufacturing the wall structure of claim 1 comprising:
   depositing a polyurethane foam-forming composition into a cavity of the wall structure to form a polyurethane foam layer in the cavity that adheres to a rear surface of at least one of: (i) a foam panel that abuts a front frame surface, the front frame surface being formed by a front surface of a first member, a front surface of a second member that is spaced apart from the first member, and a front surface of connecting members extending between the first member and the second member, wherein the foam panel, the first member, the second member, and the connecting members define the cavity; or (ii) a non-foam sheathing that abuts the front frame surface and is between the front frame surface and the foam panel so that the front frame surface such that the non-foam sheathing, the first member, the second member, and the connecting members define the cavity, wherein the polyurethane foam layer deposited in the cavity has a density, as determined by ASTM D1622-14, of 44 kg/m$^3$ (2.75 lb/ft$^3$) to 160 kg/m$^3$ (10.0 lb/ft$^3$) and exhibits a Class A rating according to ASTM E84-16 and is a cured reaction product of the polyurethane foam-forming composition, and wherein the polyurethane foam-forming composition comprises:
(a) a polyisocyanate present in an amount by weight,
(b) an aromatic polyester polyol having a functionality of greater than 2.5 and an OH number of 300 to 400 mg KOH/g, which is present in an amount of at least 50% by weight, based on total weight of the polyurethane foam-forming composition less the weight of the polyisocyanate;
(c) a catalyst, and
(d) a blowing agent composition comprising water and a hydrofluoroolefin, wherein the hydrofluoroolefin is present in an amount of 1 to 6% by weight, based on the total weight of the polyurethane foam-forming composition, less the weight of the polyisocyanate.

12. The method of claim 11, wherein the foam panel abuts the front frame surface such that the foam panel, the first member, the second member, and the connecting members define the cavity.

13. The method of claim 11, wherein the non-foam sheathing is present and abuts the front frame surface between the front frame surface and the foam panel, such that the non-foam sheathing, the first member, the second member, and the connecting members define the cavity, wherein the non-foam sheathing comprises a sheet metal sheathing having a thickness of 0.18 to 3.74 mm (0.007 to 0.147 inch) and the foam panel abuts a front surface of the sheet metal sheathing.

14. The method of claim 11, wherein the foam panel comprises a polyisocyanurate core foam layer and a facer on at least one of a rear face or a front face of the polyisocyanurate core foam layer, wherein the facer comprises a glass mat filled with recycled cardpanel and colored with carbon black, a fiberglass mat, a glass fiber-reinforced cellulosic felt, a coated and polymer-bonded fiber mat, a foil, a coated foil, a laminate comprising a foil and a membrane, a composite comprising a foil and glass, or a polyolefin film.

15. The method of claim 11, wherein the polyurethane foam-forming composition is deposited such that the polyurethane foam layer does not extend out from and overlie the front frame surface and has a thickness extending to a position intermediate the front frame surface and the rear frame surface, thereby forming a gap between a rear surface of the foam layer and the rear frame surface.

16. The method of claim 11, wherein the aromatic polyester polyol having a functionality of greater than 2.5 and an OH number of 300 to 400 mg KOH/g:
(i) has a functionality of 2.7 to 3.2, and (ii) is present in an amount of 65 to 75% by weight, based on total weight of the polyurethane foam-forming composition less the weight of the polyisocyanate.

17. The method of claim 11, wherein the hydrofluoroolefin comprises 1,1,1,4,4,4-hexafluoro-2-butene.

18. The method of claim 11, wherein the polyurethane foam has a density, as determined by ASTM D1622-14, of 51 kg/m$^3$ (3.2 lb/ft$^3$) to 80 kg/m$^3$ (5.0 lb/ft$^3$).

19. The method of claim 11, wherein the water is present in an amount of 0.5 to 1.5% by weight, based on the total weight of the polyurethane foam-forming composition, less the weight of the polyisocyanate.

20. The method of claim 11, wherein the polyurethane foam-forming composition further comprises a monomeric compound having 2 to 4 isocyanate-reactive hydrogen atoms and a molecular weight of from 32 to 399 that is present in an amount of 0.5 to 2% by weight, based on total weight of polyurethane foam-forming composition.

* * * * *